(12) United States Patent
Al Amri

(10) Patent No.: US 7,974,921 B1
(45) Date of Patent: Jul. 5, 2011

(54) BANK CHEQUE SYSTEM WITH CHEQUES HAVING MAGNETIZED STRIPS AND/OR STORAGE CHIPS

(76) Inventor: Moosa Eisa Al Amri, Dubai (AE)

( * ) Notice: Subject to any disclaimer, the term of this patent is extended or adjusted under 35 U.S.C. 154(b) by 1619 days.

(21) Appl. No.: 10/130,004

(22) PCT Filed: Nov. 21, 2000

(86) PCT No.: PCT/IB00/01710
§ 371 (c)(1),
(2), (4) Date: May 9, 2002

(87) PCT Pub. No.: WO01/41082
PCT Pub. Date: Jun. 7, 2001

(30) Foreign Application Priority Data

Dec. 5, 1999 (AE) .......................................... 131/99

(51) Int. Cl.
*G06Q 40/00* (2006.01)
*G07G 1/00* (2006.01)
(52) U.S. Cl. ................................. 705/45; 235/3; 235/17
(58) Field of Classification Search ..................... 705/45
See application file for complete search history.

(56) References Cited

U.S. PATENT DOCUMENTS

| | | | |
|---|---|---|---|
| 3,838,252 A * | 9/1974 | Hynes et al. | 360/131 |
| 4,007,355 A | 2/1977 | Moreno | |
| 4,448,631 A * | 5/1984 | Eaton et al. | 156/521 |
| 5,016,919 A | 5/1991 | Rotondo | |

(Continued)

FOREIGN PATENT DOCUMENTS

DE 195 01 620 A1 7/1996

(Continued)

OTHER PUBLICATIONS

Collins Dictionary of Business, 1995, retrieved from xreferplus, defining overdraft.*

(Continued)

*Primary Examiner* — Alexander Kalinowski
*Assistant Examiner* — Chuks Onyezia
(74) *Attorney, Agent, or Firm* — Sturm & Fix LLP

(57) ABSTRACT

A system and method to produce and use new bank checks with magnetized strips (30) and/or storage chips (33) to avoid forging in the checks and to confirm immediately upon introducing them for negotiation, whether or not sufficient funds are available. The bank check system comprises issued bank checks whose front and rear faces carry imprinted visible data (11-21) and a magnetic strip (30) and/or storage chip (33) containing stored encoded data readable by a reader so it can be checked for conformity with the visible data (11-21) to detect any unauthorized alterations to the check. The visible data (11-21) and stored encoded data include an identification of a check (19), account, drawer (15) and bank (16). The new checks include checks with a maximum value, or a fixed value that is pre-paid and blocked in the drawer's account, and "ordinary" checks, enabling to check whether the checks to be paid with a sufficient blocked amount. The invention includes a control bank system and the usage of the reader devices to confirm the correctness and safety of these checks, and can be negotiated immediately. The checks according to the invention can be made of plastic, or paper merged with plastic or any other material. The plastic in the edges of the plastic checks are thicker and non-covered with paper to carry the magnetized strip and/or storage chip, in accordance with standard specifications compatible with the reader devices.

59 Claims, 18 Drawing Sheets

U.S. PATENT DOCUMENTS

| | | | |
|---|---|---|---|
| 5,044,668 A * | 9/1991 | Wright | 283/58 |
| 5,355,411 A * | 10/1994 | MacDonald | 713/186 |
| 5,696,966 A | 12/1997 | Velarde | |
| 5,794,250 A | 8/1998 | Carino, Jr. et al. | |
| 5,834,747 A | 11/1998 | Cooper | |
| 5,905,976 A | 5/1999 | Mjolsnes et al. | |
| 6,003,014 A | 12/1999 | Lee et al. | |
| 6,003,763 A * | 12/1999 | Gallagher et al. | 235/379 |
| 6,311,165 B1 * | 10/2001 | Coutts et al. | 705/21 |
| 6,375,083 B2 * | 4/2002 | Fries et al. | 235/492 |
| 6,428,051 B1 * | 8/2002 | Herrmann et al. | 283/107 |

FOREIGN PATENT DOCUMENTS

| | | |
|---|---|---|
| DE | 197 22 627 C1 | 10/1998 |
| EP | 1 003 139 A2 | 5/2000 |
| JP | 10 260938 | 9/1998 |
| WO | WO 90/00979 | 2/1990 |
| WO | WO 92/03804 | 3/1992 |

OTHER PUBLICATIONS

D. McElroy, Using Smart Cards in Electronic Commerce, International Journal of Information Management, vol. 18, No. 1 pp. 61-72, 1998.*

Lauren Taylor, Charge cards Going a long way, Nov. 1, 1997.*

Leslie Beyer, the internet revolution, Nov. 1999.*

Helen Stock, Supermarket Industry Shopping for Ways to reduce payment Expenses, Nov. 29, 1999.*

* cited by examiner

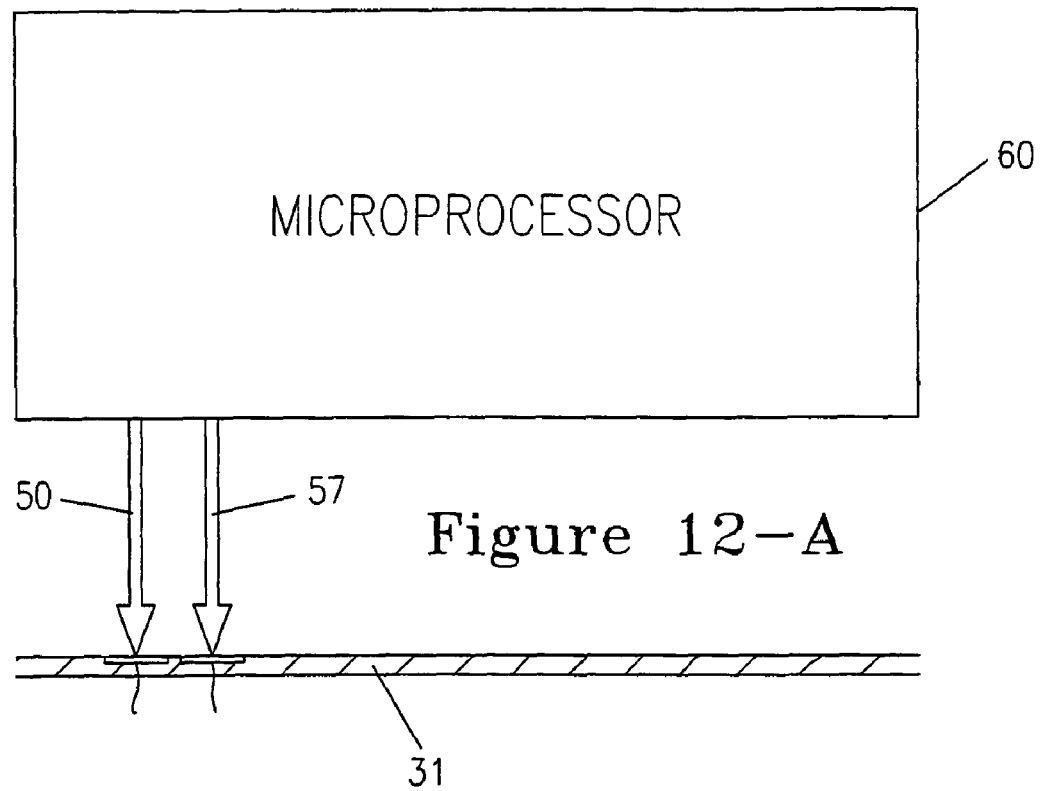
Figure 12-A
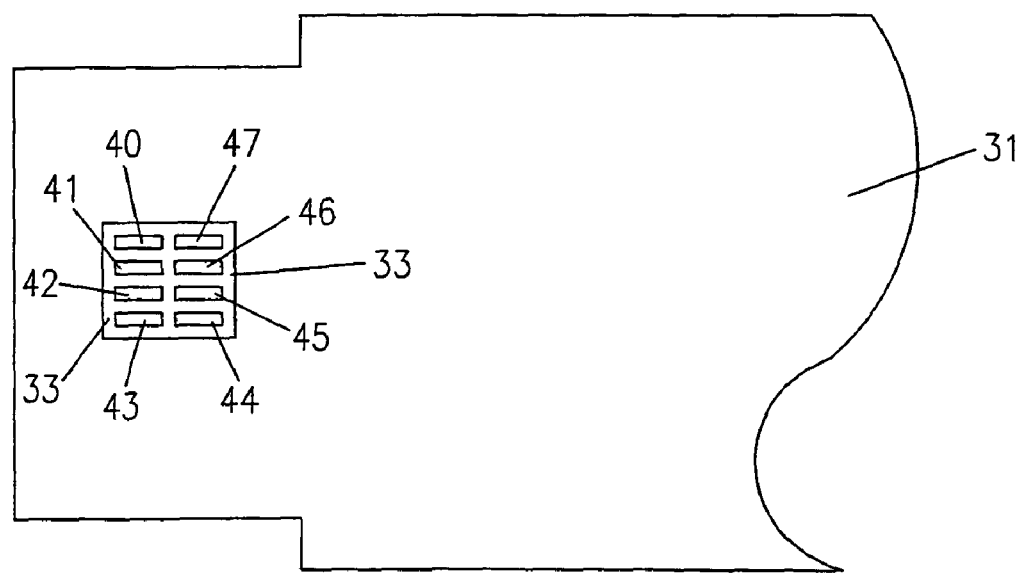
Figure 12-B

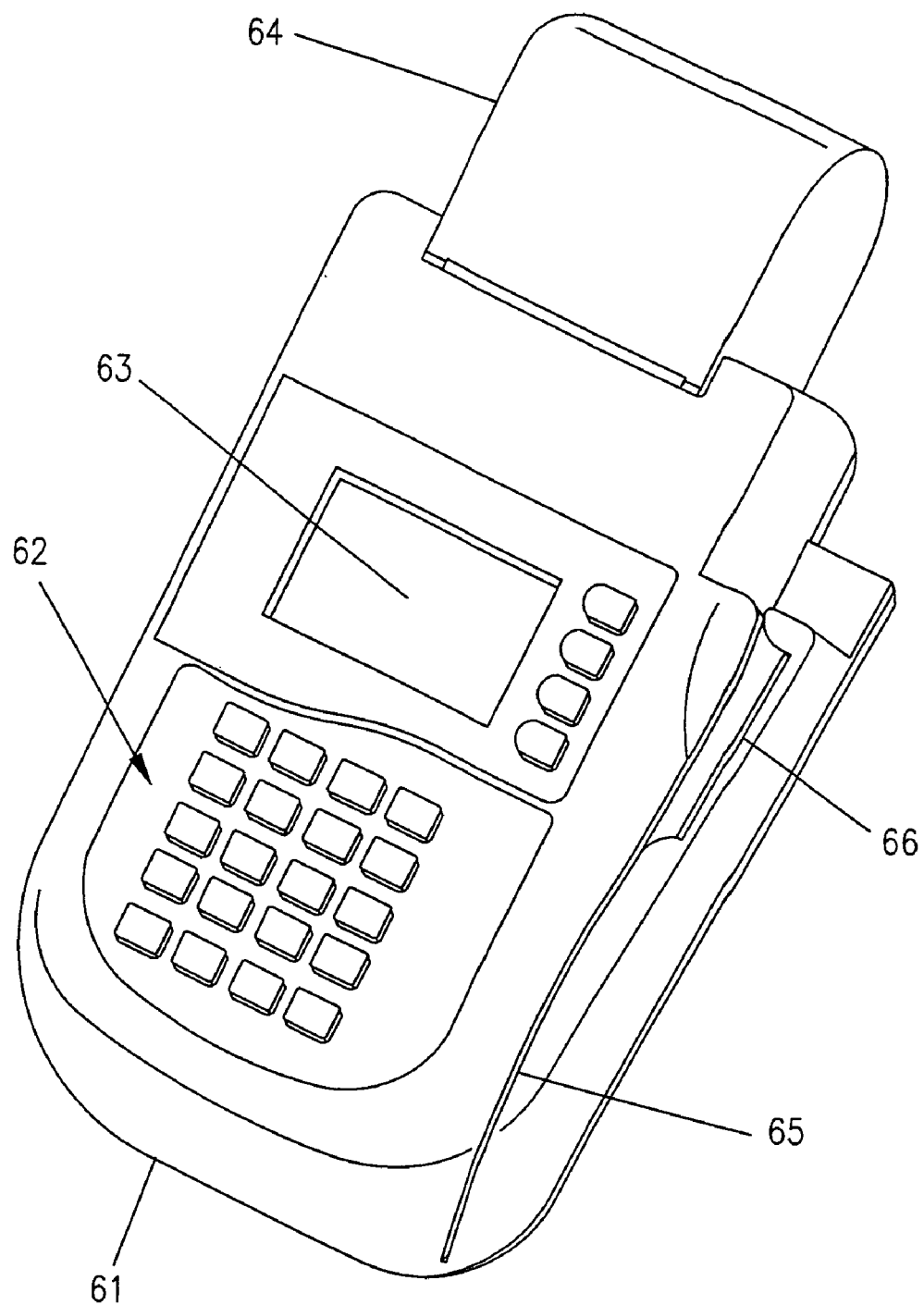
Figure 12/C

BANK CHEQUE SYSTEM WITH CHEQUES HAVING MAGNETIZED STRIPS AND/OR STORAGE CHIPS

CROSS-REFERENCE TO RELATED APPLICATIONS

This application is the national phase application of International Application No. PCT/IB00/01710 filed Nov. 21, 2000, which claims priority of United Arab Emirates No. 131/99 filed Dec. 5, 1999, entitled "Bank Cheque System With Cheques Having Magnetized Strips and/or Storage Chips."

FIELD OF THE INVENTION

The invention relates to a bank cheque system wherein banks issue cheques carrying on their front faces imprinted visible data, rear faces for endorsement, and a magnetized strip and/or storage chip having an invisible magnetic (stored) encoded data, as well as the magnetized cheques themselves and methods of controlling the authenticity and guaranteeing the funding of such cheques.

The invention also pertains to methods, and electronic systems and magnetized strips and/or storage chips, used to produce and use fresh and new magnetized cheques to discover any forging in the magnetized cheques immediately upon introducing them for negotiation, to instantly state and confirm whether or not sufficient funds are available, and to avoid the damages that could result from forging ordinary cheques, or the non-availability of sufficient funds.

BACKGROUND OF THE INVENTION

The invention relates to new cheques made of paper and/or plastic or any other material, the cheques being merged and compacted with magnetized strips and/or storage chips, and to the use of reader devices to discover any unauthorized alteration or forging in the cheques, immediately upon introducing them for negotiation, to state and confirm instantly whether or not sufficient funds are available, and to avoid the damages that could result by forging ordinary cheques, or the non-availability of sufficient funds.

A summary of the prior art is presented in the following fields: A—Magnetized strips, and their writer and reader devices; B—Cheques; C—Storage chips; and D—Writer and reader devices for the storage chips.

(A)—Prior Art in the Field of Using Magnetized Strips, and their Writer and Reader Devices Using magnetized strips is a well know art in other applicable fields viz., using magnetized strips in underground train tickets, to enter and exit underground train stations using these tickets.

In this case, the tickets are provided with magnetized strips, which are specially digitally programmed, and pass through reader systems at the gates of the stations. These tickets can be read, in accordance with the digital record which is entered in the magnetized strip regarding the number of the stations for instance, by the reader systems (the gates), so the holder of the ticket will be able to pass through, in accordance with the data and particulars programmed in it.

Also, the same is applicable to monthly, quarterly, or semi-annual subscriptions, and so on.

As aforementioned, the magnetized strip can be digitally programmed in accordance with the numbers of the stations in daily tickets used for one use only. Programming these strips is made in a way that fulfills the purpose of their usage. In accordance with the purpose, the programming systems and reader systems deal with these strips to perform the functions, to achieve financial and economical security. Also criminal security will be achieved by preventing non-holders or non-subscribers to enter or to exit the station.

Magnetized strips have further applicable fields as well, viz., as keys for hotel rooms where the magnetized strip is used as a key and the locks of the doors are used as a reader of that strip, so whenever the magnetized particulars and data correspond with those entered and available in the lock, the door will be opened.

Thus, the user of the room can only enter and pass through by using the indicated magnetized strip.

This can also fulfill two types of economical and criminal security.

Also, magnetized strips are used in the field of travel and flight, particularly for boarding passes. After booking the seats on the flights and upon the arrival of the passenger, holder of an ordinary ticket, to the airport, these ordinary paper tickets are replaced by other tickets provided with a magnetized strip on which all the particulars of the passengers on the tickets are programmed, particularly the flight number, the seat number, the line number, the entrance No, or the gate, and similar particulars.

The counterpart of the ticket provided with the magnetized strip remains with the air flight representative, before the passenger directly proceeds to the aircraft, while the other part of the ticket is retained by the passenger as a voucher to enter the aircraft and identify the passenger's reserved seat.

This also fulfills two types of security: economical security, by not tampering with the ticket, that could reduce its price and prevents forging it. Also, criminal security by only allowing the legal holder of the ticket to board.

We, in our invention propose a remedy for the phenomenon of bounced and dishonored cheques, and to put an end to this, propose to provide the current cheques with magnetized strips which are similar in shape to the tickets of a boarding pass provided with a magnetized strip, but which are functionally adapted to suit the nature and function of cheques and negotiable instruments, and represent a monetary right. The new cheques have also all the specifications contained in ordinary cheques. However, the magnetized strip provides the cheques with safety and security regarding non-forging, non-tampering with them and to make sure that the cheque has a suitable, proper, and sufficient funding, that can remedy the flaws and faults attributed to standard cheques and accordingly fulfill both economical and criminal security.

Moreover, the value of most cheques exceeds thousands of dollars, much more than the value of an underground train ticket or the price of an air ticket. Accordingly, the cheque needs to be given appropriate protection due to the considerable value of some cheques, which sometimes exceeds by hundred folds the value of an air ticket.

(B)—Prior Art in the Field of Cheques

Conventional cheques contain printed data and particulars. As all of the cheque's particulars are visible, and contain code numbers with the following: (cheque number, bank and branch number, account number), and the name of the drawer. It is not possible to make sure whether or not the cheque is sufficiently funded, except during official bank opening hours. These cheques can only be transacted through computers located inside the bank. Verifying and scrutinizing the particulars and data of the cheque regarding the correctness and genuineness of the amount, the correctness of the signature and its correspondence with the other particulars can only be made by resorting to a bank. Moreover, conventional cheques can easily be forged by altering its particulars, and forgery cannot easily be discovered.

It has already been proposed to imprint bank cheques with visible readable characters in magnetic ink (MICR technology) enabling automatic processing of the cheques.

U.S. Pat. No. 5,016,919 discloses a bank check with characters printed on the cheque in magnetic ink using MICR technology.

WO 90/00979 also discloses a cheque with characters printed in magnetic ink using MICR technology (i.e. visually readable magnetic letters, not a strip).

None of the proposals has adequately dealt with the problem of easily detecting unauthorized alterations to the cheque.

In spite of these proposals, there has been a general loss of confidence in the use of bank cheques due to abuse by unscrupulous persons and negligence by account holders who fail to keep track of their account balance and issue cheques that are not covered when presented later, all of which has led to a considerable amount of litigation concerning cheques issued without sufficient funds, with a consequential burden on the executive and judicial authorities. This is largely due to the fact that the users of the system have deviated from the intention of the legislator regarding the definition of the cheque in commercial law, whereby the cheque is an instrument of clearance and repayment, that should take the stand of money.

(C)—Prior Art in the Field of Storage Chips

U.S. Pat. No. 6,003,014 entitled "Method and apparatus for acquiring access using a smart card" discloses generally payment systems, more particularly payment systems using smart cards. Portable transaction cards with processing power or so-called "smart cards" have been developed in the size of conventional plastic credit cards. These smart cards can include an embedded computer chip having processing power and memory. The International Standard Organization (ISO) has established a number of specifications for such electronic cards.

This patent and U.S. Pat. No. 4,007,355 are considered as prior art on the speedy treatment system of storage chips added to and merged with the smart cheques.

Also, U.S. Pat. No. 6,003,014 considered that one application for smart cards is as an electronic purse of "stored value card". In this type of application, a prepaid amount of value or representation of currency is stored in the smart card memory for use in the place of conventional cash. The source of the value stored in a card may be, for example, a bank account, a credit card, a debit card, another electronic card, currency, or other sources of funds.

This is practically the rule of the plastic cheque merged with storage chip as first form (A, B) pertaining to the invention as discussed hereinafter.

Stored value card systems are operated as both "open" or "closed" systems. "Closed" systems are limited to specific participating merchants. For example, some universities offer stored value cards to their students for use in university cafeterias and bookstores. The cards are not compatible with point of sale devices or terminals outside the university. These "closed" systems are easier to implement from a technical and security perspective because of this closed universe of uses. "Open" systems, on the other hand, allow use of the card at substantially any merchant, who has a compatible point of sale device or card reader. An example of such a system is the "Visa Cash" (Trademark) System offered by the Visa International Service Association of San Francisco Calif. In many respects, "open" stored value card systems are preferable to "closed" systems, as they allow the cards to be used in a wide variety of places, for various types of purchases. "Open" systems, however, are more difficult to implement and have more rigorous security requirements.

U.S. patent application Ser. No. 08/951,614, entitled "Internet Payment System Using Smart Cards", filed on Oct. 16, 1997, used stored value cards in making payments over open networks such as the interne.

EP Patent 1 003 139 entitled "An Internet payment and loading systems using a smart card", relates generally to a payment system and value loading systems using a computer network, more specifically a payment system and a value loading system for a smart card using an open network such as the Internet. The invention disclosed the disadvantages of the usage of the credit cards, the cash transactions with Cyber Cash, the digital, token-based system through DigiCash. The unique identification number, offered by First Virtual Holding, Inc. in the EP Patent 1 003 139 can be used on the Internet network to avoid the disadvantages of the prior art in the field of loading the storage chip mentioned in the aforementioned patent. However, this patent can be distinguished as prior art relating to the usage of the cheques of this invention on the Internet. In this case it is might be to send the cheque to the beneficiary, and in same time may be innovate a sample from these cheques which not mentioned in our invention.

EP Patent 1 003 139 is illustrated in FIGS. 16 and 17 attached to this application, and summarized in the following:

An architecture and system loads and uses a smart card 5 for payment of goods and/or services purchased on-line over the Internet 202. A client module on a client terminal 204 controls the interaction with a consumer and interfaces to a card reader 210, which accepts the consumer's smart card 5 and allows loading and debiting of the card. Debiting works in conjunction with a merchant server 208 and a payment server 206. Loading works in conjunction with a bank server 860 and a load server 862. The Internet provides the routing functionality between the client terminal and the various servers. A payment server 206 on the Internet includes a computer and a security module (or a security card 218 in a terminal 214 to handle the transaction, data store and collection. A merchant server 208 advertises the goods and/or services offered by a merchant for sale on a web site. The merchant contracts with an acquirer to accept smart card payment for goods and/or services purchased over the Internet. A consumer uses his smart card 5 at the client terminal 204 in order to purchase goods and/or services from the remote merchant server 208. The client terminal sends a draw request to the payment server. The payment server processes confirm and reply to the merchant server (optionally by way of the client terminal). To load value, the client terminal 204 requests a load from a user account at the bank server 860. A load request is sent from the card 5 to the load server 862. Which processes, confirms and replies to the bank server (optionally by way of the client terminal). The bank transfers loaded funds to the card issuer 108 for later settlement for a merchant from whom the user purchases goods with value on the card.

(D)—Prior Art in the Field of Writer and Reader Devices of Storage Chips

From German Patent application 19 501 620, which had not been published by the filing date of the present priority application on May 12, 1999, a card reader for chip cards is known which includes a contact arrangement with contacts that are electrically consecutively connected to the contacts of the chip card microchip when the chip card is locked in the card slot of the card reader. The contacts of the contact arrangement are lengthened in the insertion direction of the chip card far enough that the connection with the contacts on the chip card is maintained even when the withdrawal of the chip card has been begun.

SUMMARY OF THE INVENTION

The invention proposes a bank cheque system comprising bank cheques each having a front face and a rear face, the front face carrying imprinted visible data, the rear face for endorsement, and the cheque also carrying a magnetic strip or storage chip containing stored encoded data. The stored encoded data is readable by means of a reader so it can be checked for conformity with the visible data to detect any unauthorized alterations to the cheques. The stored encoded data includes an identification of a drawer account to ascertain if the drawer account contains a sufficient blocked amount to cover the amount of the cheque or not.

These bank cheques can be pre-paid, or drawn against a current account.

Pre-paid cheques have visible data (imprinted and written) and stored encoded data (stored in the magnetic stripe or storage chip) that each indicates a value of the cheque, this value being covered by a pre-paid amount credited to and frozen in the cheque account.

In a first type (A) of pre-paid cheque according to the invention, the visible data (imprinted and written) and stored encoded data (stored in the magnetic stripe or storage chip) each indicate a maximum value of the cheque, this maximum amount corresponding to a pre-paid blocked amount, which maximum value should not be exceeded by the real value of the cheque upon issue. In this form the amount deposited shall be equal to the number of cheques issued multiplied by the maximum value of each cheque.

In a first type (B) of pre-paid cheque according to the invention, the visible data (imprinted and written) and stored encoded data (stored in a magnetic stripe or storage chip) each indicate a fixed value of the cheque, this fixed value corresponding to a pre-paid blocked amount credited to the cheque account.

In the first form (A, B) as explained, there are visible imprinted data and stored encoded data on the magnetized strip and/or storage chip. Each of these data identify the bank name, branch, amount, cheque number and account number. By passing or entering the cheque through the reader device, the stored encoded data is read and its conformity with the imprinted data checked to confirm the correctness of the cheque and the balance.

The second type of cheque according to the invention can be paid or endorsed as a cash instrument from a current account as follows. The drawer account can be funded on presentation of the cheque to the beneficiary to transfer from the drawer's current account to the beneficiary an amount corresponding to an amount written on the cheque, this amount then being blocked in the cheque account. Such transfer is made immediately after passing or entering the cheque through a reader connected to a banking system, to ascertain that the current account of the nominal cheque drawer contains a sufficient credit to cover the transfer.

When the holder of a cheque of the latter type fills in the amount of the cheque, the beneficiary can immediately pass the cheque through a reader, enter the amount to be paid and, when the confirmation is received that the current account is sufficiently funded, transfer the amount written on the cheque to be blocked in the cheque account. This simple expedient avoids the holder the possible embarrassment that when the beneficiary presents the cheque, the current account any no longer be sufficiently funded and the cheque will be refused.

In a further aspect, the bank cheque's stored encoded data comprises a signature expressed by a set of codes, letters, numbers on the magnetized strip and appears on a PC associated with the reader device, or the original signature may be stored as an original copy (image) of the signature (scanned image) on the storage chip associated therewith, advantageously containing an image of at least one identification means, such as in identification photograph, and image of the drawer's signature, etc.

The bank cheque system generally further comprises a plurality of readers for reading the stored encoded data on the cheques, and a banking control system which includes servers at individual banks and a central banking control unit. The readers are connectable to such banking control system by a communications network.

Another aspect of the invention is the magnetized bank cheque having a front face carrying imprinted and written visible data, a rear face for endorsement, and carrying a magnetic strip or storage chip containing stored encoded data, the stored encoded data being readable by means of a reader so its conformity with the visible data can be verified to detect any unauthorized alterations to the cheque. The cheque bears an indication of an amount to be paid which is either a printed fixed amount, a printed maximum amount associated with an entered variable amount up to said maximum amount, or an entered non-predefined variable amount. The stored encoded data includes an identification of a cheque account containing blocked funds to cover the amount of the cheque and further includes a verification that the blocked funds in the cheque account contain a sufficient blocked amount to cover the amount to be paid, whereby the cheque is payable in cash or can be endorsed as a cash instrument.

The invention also pertains to a method of controlling the authenticity and guaranteeing security of the funding of cheques in a bank cheque system as set out above. This method comprises passing or entering a cheque through a reader connected to a banking control system, comparing the imprinted visible data on the cheque with the read stored encoded data, ascertaining whether or not the cheque account contains a sufficient blocked amount, so that accordingly the cheque can be paid or endorsed as a cash instrument.

This method includes issuing cheques of the different types as set out above. For cheques which have a space for entry of a non-predefined amount to be paid (second type), and whose visible data (imprinted and written) and stored encoded data each identify a current account from which the cheque account can be funded. The method further comprises passing or entering the cheque through a reader connected to a banking control system, entering into the reader an amount to be paid written on the cheque, and transferring funds to the cheque account.

ADVANTAGEOUS FEATURES OF THE INVENTION

This bank cheque system and method enable the beneficiary to make sure of the existence of a sufficient fund and balance, that can give absolute confidence of the beneficiary to deal with this system, without any prejudice to the confidentiality of the accounts. It can also restore a mutual confidence between the drawer and the beneficiary, which was lost due to the faults of the current system of cheques, the new cheques constituting a cash instrument of repayment and clearance that can take the stand of money and could be alternative to it.

This system can boost confidence in dealing with cheques on the national level, so that cheques become used more widely for commercial and economical settlement.

The increased confidence in those who deal with this system is due to the following reasons:— a—Those who do not have sufficient funds will not be able to deal with the pre-paid cheques, because the value must be available prior to issuing the cheque.

b—It can restore confidence to the cheque system, which confidence was lost under the current system.

c—The new cheque goes along with the intention of the legislator regarding the definition of the cheque in commercial law, whereby the cheque is an instrument of clearance and repayment, that can take the stand of money.

d—It reduces fraud against the banks, the beneficiaries and others. And can lead to simplification of clearance and repayment systems, because the system using ordinary cheques caused damage to many national banks and others.

e—It protects individuals and businessmen from crooks who illegally obtain funds using unsecured cheques, and protect the national economy from illegal transfer of money abroad.

f—It creates confidence in transactions among the businessmen, which should contribute to economical development and prosperity.

g—This system avoids problems related to tampering with, forging, or committing fraud with the cheques by ascertaining from the particulars of the cheque at each point of dealing.

h—This system protects banks and individuals from tampering and fraud.

i—This system provides safety for the cheque, drawer and beneficiary, for the cheque by protecting it from tampering, to keep the funds of the drawer, and to avoid any fraud to the beneficiary by using tampered or dishonored cheques.

j—The system provides fast, confident, and easy dealing around the clock.

k—These cheques can be dealt with as traveler's cheques that can be issued in multiple currencies and categories, as they can avail such traveler's cheques with more guarantees and security.

Dealing with these cheques should reduce the present-day considerable amount of litigation regarding cheques, issued without sufficient funds, thereby reducing the burden of the executive and judicial authorities from the large number of such cases under the present system. In addition, it should save the state huge amounts that are disbursed to execute and implement the resulting orders, decisions and jail sentences.

Through using this invention, verification of the particulars of the cheque will be simplified, and accordingly forging of cheques will be avoided.

In summary, the magnetized cheques in the system according to the invention contain all printed data and particulars and can be rapidly processed through computers, inside and outside of the bank using magnetic reader machines. The cheques contain invisible magnetized particulars, in addition to the visible printed ones. The stored encoded data and particulars contain the name of the drawer and a code number including:—(the number of the cheque, the number of the bank and branch, and the number of the account). Its particulars are scrutinized and checked though reader devices inside and out of the banks all around the clock. It can be ascertained whether or not the cheque is funded, immediately after entering the particulars of the cheque and the order to transfer the value from the account of the drawer to the cheque account, and all particulars can be ascertained all around the clock.

Optionally, technology will be provided for verifying the correctness of the signature by computer around the clock, and the signature could be an electronic signature as explained below.

Consequently, this system supersedes the ordinary system in checking the availability of sufficient funds, the correctness of the particulars together with the correctness and correspondence of the signature.

It is also difficult to forge or tamper with the cheque's particulars, and forgery can be discovered immediately upon depositing the cheque for negotiation, by passing or entering it through the magnetic reader machine. Moreover, once verified, the cheque can be endorsed as a negotiable cash instrument.

The invention thus covers a bank cheque system using magnetized cheques wherein the printed paper or other material of the cheque is merged and connected with a magnetized strip and/or storage chip fixed on any portion and part of the cheque, the paper of the cheque and the magnetized strip and/or storage chip forming one integral single unit, both of them constituting the magnetized cheque, within the specifications, drawings and features described in detail below.

The system of the invention also concerns a new usage of the devices used in reading magnetized strips and/or storage chips, for reading the particulars of the cheques as well as a new usage of industrial methods and means to produce the new cheques, program and use magnetized strips in the field of cheques.

The magnetic strip or storage chip is fixed on any portion of the printed cheque so as to prevent removal, or tampering with it. Both the cheque and the magnetized strip and/or storage chip are produced and dealt with as one single unit. The magnetized strip allows for the possibility of storing and keeping the original signature of the drawer of the cheque, as a set of codes, letters, numbers, and the storage chip allows for the possibility of storing the original signature of the drawer as an original copy of a cheque (scanned image). Also, in the same way the image of the thumb impression or the personal photograph of the issuer of the cheque could be stored.

The magnetic strip or storage chip contains programmed confidential information that is entered by the bank only.

The bank cheque system of the invention involves a new usage of main computers systems (File Servers) which are used to store the data required on the cheque. These file servers are connected with the computer servers of the banks, who are participants and subscribers to this service.

It also involves a new usage of telecommunication systems to connect between the reader system the main system (File Server) and the computer network, which will be used in connection with the bank's computer systems as well.

The bank cheque system also makes use of communications devices (Modems) with fast and precise connection links. These links will be interconnected and all the required security control elements and measures will be placed on them, including network security systems and Fire Wall Devices. The bank cheque system preferably incorporates interconnected data bases (Relational Data Base Management System), used for saving and storing all the information pertaining to the cheques, the magnetized strips and/or storage chips, the particulars of the beneficiaries, and all the security control elements. Examples are: DBMS, Oracle, Information, Sybase, etc. . .

Examples of the programming language used for developing the programs, information programs, which will match with the readers systems, encoding the magnetized strips and/or storage chips and entering the financial movements which are executed and transacted etc., are the languages C++, JAVA and C.

All the programmed confidential data, information and particulars are encoded on the magnetized strip or storage chip, aiming at using them for the purpose of checking and scrutinizing the cheque by the magnetic reader machines, through the computer systems, connected to computer networks.

This enables fully scrutinizing and checking the particulars of the cheque for correspondence with the magnetized (stored) particulars of all the printed and written particulars, and the possibility of corresponding those particulars pertaining to the balance by the reader devices, through the computer systems connected with the computer network, and the possibility of checking and scrutinizing the signature in the same way.

A data processing Center (File Server), which is a sophisticated center containing the most sophisticated and developed systems and networks, will be connected with branch centers of the bank cheque system available in every state that uses those cheques, so that these branch centers are connected with the main centers on one hand, and with the participating banks on the other hand, and with the reader systems, providing an integrated security system. This means the above mentioned system is a global system that can be executed around the clock and can be used in e-commerce.

Implementation of the bank cheque system with prepaid cheques (first type A & B) involves depositing, freezing and determining the balance of each cheque before the client receives a cheque book for this balance, so going along with the aim and intention of the legislator regarding dealing in cheques, and particularly as the cheque can be a cash instrument in the stand of money.

The pre-paid cheques (first type A&B) can also be used as traveler's cheques, for multiple categories and various currencies.

Implementation of the bank cheque system with non-prepaid cheques (second type) can involve transferring and freezing the value of the cheque issued by this form, from the balance of the current account of the drawer to the cheque account immediately by passing or entering the cheque through the magnetized particulars reader machine, and entering its particulars.

Implementation of the bank cheque system also involves checking and scrutinizing the sufficiency of the balance when the cheque is presented, all round the clock.

The overall bank cheque system involves a new usage of a Mid-Range server on which the main data base is stored, and pertains to the various transactions that will be executed among the various banks and financial institutions, to execute the operation of the required financial transfers, processing and settlement.

A Relational Database Management System (RDBMS), is preferably used, containing all the particulars and information pertaining to the numbers of the cheques, together with the transactions to be executed, the bank codes, the reader units and others.

The overall bank cheque system will also normally involve Communication Devices and Peripherals through which connection will be made between the aforementioned Mid-Range Server and the below-mentioned sub-servers, all these systems allowing the various types of communication possibilities, including Dial-Up, Lease Line, ISDN, etc.

The overall bank cheque system will also usually involve Fire Walls, through which monitoring, controlling and managing all the communications with the Mid-Range Server will be made, and which eliminates any unauthorized entry. The above-mentioned elements will preferably be installed within the Main Processing Center of the authority in charge of the bank cheque system according to the invention, for transacting all the transactions pertaining to it.

Another usual component of the overall bank cheque system is a Sub-Server, which is a computer that will be installed at every bank participating and subscribing in the service of the bank cheque system according to the invention, on which data and particulars pertaining to the subscribers will be stored, together with the serial numbers of the magnetized cheques issued by the bank and the same will be associated with the clients accounts, etc.

A further usual component of the overall bank cheque system is a Sub Relational Database Management System (RDBMS), this data base will contain the data and particulars mentioned in the previous paragraph, as such data and information will be confined in the clients of the bank only.

The bank cheque system will also include adequate Sub-Communication Devices & Peripherals through which connections are made between the server mentioned above, and the reader systems, the processing systems mentioned below and the above-mentioned sub-server.

Sub-Fire Walls, which are devices enabling protection, monitoring, and controlling the entries made to the sub-server mentioned above, can also be provided.

The Reader Devices of the New Cheque:

The overall bank cheque system also includes new cheque reader systems which are the units/systems and programs installed with the various parties that will make transactions with and handle the new cheques, including shops, businesses, companies, hotels, etc. The readers for the new cheque are distinguished by the following:

a—They have the capability to read and display the images stored on the magnetized strip itself as set of codes, letters, numbers, and the stored image on a storage chip, which can be original signature itself of the cheque's drawer's (scanned image). Also, the stored image on the storage chip could be the image of the thumb impression or the personal photograph of the cheque's drawer.

b—The reader device can be connected to a PC, through which the stored images, viz., the image of the signature, the image of the thumb impression or the personal photograph of the cheque's drawer could be read and displayed as a security measure. The connection will be by recognized methods, including direct connection thorough RS 232 or RS 422, etc., or through an internal or external connection or a wireless connection, other known methods, or methods that become available in the future.

This reader device may be the same system, or similar to the system used in reading Credit Cards, or Points-Of-Sale (POS) system, with the capacity of reading the magnetized strip or storage chip, and may include a personal computer (PC) associated with a reading unit of the magnetic reader. Alternatively, it may be a hand-held reader.

This reader device system will be connected with the aforementioned sub-servers through communication systems that allow the above mentioned types of connection. The reader systems will contain means for reading the magnetic strip or storage chip on the cheque, together with a keyboard by means of which the data and particulars pertaining to the transactions to be executed will be entered.

Also, currently in the market, there are devices that can read both the magnetized strips and storage chips through special paths for each one separately (as shown in FIG. 12-C). These devices used to read the card with magnetized strips and storage chips, and can be used to read the cheques with magnetized strips only, or the cheques with storage chips only, or the cheques with both of magnetized strips and storage chips, as shown in FIGS. 8-1, 8-2, 9-1, 9-2, 10-1, 10-2.

The new cheque is a bank paper/plastic issued by an approved bank which is participant and subscriber of the services of the bank cheque system of the invention, this cheque being constituted of the paper and/or plastic itself together with the integrated magnetized strip and/or storage chip. All the elements mentioned above will be connected together, through an integrated communications network as above specified.

The Method of Making the Plastic Cheque

The plastic cheque is made of plastic and paper, by the following method:

The cheque is made with a rectangular chip of plastic papers, in accordance with the standard recognized dimensions in the ordinary cheques, so that the cheque shall include a thick portion, and this portion shall be in accordance with the standard specifications that suit the reader systems to be able to deal with the data reading machines, as those for credit card systems.

This thick portion will be merged with a magnetic strip and/or storage chip, on which the required data and particulars for cheque will be programmed and such particulars and information will be invisible, while the particulars and information will be readable by the currently available readers, the same as for credit cards with a magnetized strip and/or storage chip.

As for the balance area, the same will be packed and laminated on the two sides with ordinary writing papers as on the face the ordinary particulars of the cheque will be printed, viz. the code number includes;—(number of the cheque, number of the bank, the branch, and the account number). Also these particulars and information contain the number of the cheque, name of the cheque, and branch, name of the drawer and another place to put down and write the name of the beneficiary, the value, the signature. Writing on it shall be possible by fountain pen, ball-point pen, or otherwise, as for ordinary papers, while the back side of the cheque shall be left for endorsement.

Further, this packing and lamination will be thermally fixed and laminated, or bonded by any other method, so that it will not be possible to remove the paper portion from the plastic portion without damage. Further, the cheque is made by the following steps:—

1—One of the sides of the cheque is made of plastic. Its width is for example 8.5 cm with a thickness similar to that used in credit cards. This thickness will continue for a distance of 2 cm and the dimension of the area could be for instance 8.5×2 cm=17 cm. This area, in which the magnetic strip is merged with and requested to read the cheque with the suitable reader. We have cited these dimensions as an explanatory example. This area should be accordance with the required standard specifications for the possibility of writing and reading through the readers on the magnetized strip or storage chip.

2—The thickness becomes directly less in the opposite direction of this side, after the area specified in the article 1, into a thickness similar to the thickness of the ordinary paper, or any other suitable thickness.

3—Suitable paper will be merged on the rest of the plastic paper of the cheque on the two sides of the cheque, after the thick area into which the magnetized strip was merged on the plastic paper.

4—All the required particulars, viz. the cheque number, name of the drawer, the bank and branch, and the code number containing:—(cheque number, number of the bank and branch, account number) shall be printed on the face of the cheque, it being observed that there may be a difference of some of the particulars from one form to the other one (the first form A, B, and the second form). Further, the same particulars on the face of the cheque are stored on the magnetized strip so that they will be invisible and will be readable by the magnetized particulars readers.

5—The rear paper face (the back leaf) of the cheque shall be left to be used for endorsing the cheque. So, if merging the magnetized strip was made on the back side of the cheque, the same will be near one of the side which is allotted to merge the strip that has a thickness suitable for the credit card readers or otherwise, while the rest of the area will be left for endorsement.

6—The magnetized strip may be merged on the front or rear face of the cheque near one to the sides with dimensions to suit the current readers, and this can be easily read with the available systems used to read credit cards at most of points of sale (POS).

7—Also the magnetized strip may be merged in any other location of the plastic cheque other than above mentioned, in which case the same could require special specifications for the readers of the cheque in case of difference of the position of the magnetized strip to suit current readers. Also all the area of the cheque could be of one fixed thickness to suit the currently available readers, in which case the magnetized strip could be placed in any location of a cheque either in the back side or in its face in a suitable way for the reader device, after merging the suitable paper in the rest of the area which is not occupied by the magnetized strip.

Method of Making the Cheque with a Storage Chip

The cheque with storage chip is made of any suitable type of plastic, in accordance with the recognized dimensions in the ordinary cheques, or any required dimensions. A storage chip is merged with the plastic portion so that it will be difficult to separate and remove it, while the plastic part allotted for the strip will be with an area and thickness suitable for the readers. As for the rest of the cheque the same shall be with the ordinary thickness.

Further, the plastic ply is merged with double ply paper on the two sides, with any method of the merging methods, and let it be the way of thermal merging, so that the storage chip will remain uncovered.

Also, the paper of the cheque will be printed with putting down all the printed particulars, viz, the code number contains:—(the cheque number, number of the bank and branch, account number), together with the name of the drawer of any other particulars required to be printed on the face of the cheque, while the rear side (back leaf) of the cheque will be left for endorsement.

So, this storage chip provides the possibilities to record and store a large quantity of particulars on it, whether such particulars, data and information are stored as per need, and whether they are pictures, particulars information, or codes.

Furthermore, it is possible through these storage chips to realize and make sure of the soundness of these cheques, and the correspondence of their particulars with those put down and printed on the cheque and securing dealing with them. Also it is possible to check all the particulars of the drawer, the cheque, the bank, and the signature, the photograph or the thumb impression to confirm the soundness and correctness of these cheques and accepting them in negotiation without bearing to the risks of the non-availability of funds, sufficiency or changing the value by tampering with the printed particulars, tampering or forging the signature, forging the thumb impression or the photograph, in all cases to confirm all the particulars that the beneficiary is desirous to be sure to reach deliberation safety and successfully. Also it is possible to confirm securing the cheque against the risks of fraud, cheating, even theft and forging the signature, the thumb impression or the picture of the drawer, all this avails the full security of the cheque and avoids the traditional defaults directed to the cheque under its current position.

Also, it is possible to make to a plastic cheque with a magnetized strip and/or storage chip by any other method, for example: the paper of the cheque may be in the middle between two plys of transparent plastic, leaving spaces without covering to add the required particulars and data on it, or using it in the endorsement.

A Comparison of Various Features of the Specifications of (I) Paper Magnetized Cheques, (II) Plastic Magnetized Cheques and (III) Cheques with a Storage Chip 1—The Thickness of the Cheque (I) The thickness of the paper cheque is fixed in all the area of the cheque and the magnetized strip is merged with the cheque.

(II) A—The plastic cheques are produced with private specifications in which the thickness of the cheque is different, so that the thickness is reduced directly after the area unalloted for the magnetized strip which is thicker. As for the rest of the area of the cheque, it will be of the same thickness as an ordinary cheque.

(III) The cheque with storage chip has a changeable thickness, so that it will be thick at the place of merging the electronic storage chip, but not exceeding the thickness of credit cards. The thick area will be suitable for the readers, and the thickness of the rest of the cheque is equal to the thickness of the plastic paper plus the thickness of the two merged papers on the two faces.

2—The Materials of Making the Cheque.

(I) The cheque is made of suitable paper, on which the magnetized strip is merged.

(II) The cheque is made of a plastic paper of any suitable type of plastic or any other similar material that have the same specifications. The magnetized strip is merged with the thick portion of the cheque and the apparent side shall be suitable for the readers to read its particulars as the area and specifications of the thick portion shall be suitable for the reader and writer systems. The non-thick plastic portion is merged with suitable paper in two sides of 1 mm thickness by any one of the methods of merging, for example the method of thermal merging.

(III) The cheque is made of a plastic paper of any suitable type of plastic or any other similar material having the same specifications. The storage chip is merged with the thick portion of the cheque and the apparent side shall be suitable for the readers, to read its particulars as the area and specifications of the thick portion shall be suitable for the reader and writer systems. The non-thick plastic portion is merged with suitable paper in two sides of 1 mm thickness by any one of the methods of merging, for example the method of thermal merging.

3—Place of the Magnetized Strip or the Storage Chip.

(I) The magnetized strip is placed anywhere on the face of the cheque or inside it.

(II) A—The magnetized strip is placed on the face of the back side of the plastic cheque on plastic with a thickness area to suit the readers (the readers of credit cards) or otherwise.

B—The magnetized strip is placed on any place of the plastic cheque whether it is on the back side or its face for instance, in which case the position of the magnetized strip is different from the suitable positions of the current available readers (like credit card readers), in which case we could need a reader with private specifications.

C—The plastic cheque can be produced with a fixed thickness in all its area to suit the present of future readers, in which case the magnetized strip is placed in any suitable position on the cheque.

(III) The electronic chip can be placed anywhere on the cheque, so that it will be merged with the plastic paper and the thickness of the cheque in this portion will be suitable for the reader and writer systems, and the chip is not covered so that the writer and reader systems can deal with them to insert and review and recover the particulars stored on them.

4—The Thickness of the Cheque Book (I) The thickness of an ordinary cheque book.

(II) A—The thickness of the cheque book is bigger in the area which is allotted for the magnetized strip and less in the rest of the area of the book.

B—The other type of cheque book is thicker due to the fixation of the thickness on all the area of the cheque viz, the credit card or otherwise, on which coordinated paper is merged to print and write the cheque in two sides in the area specialized to merge the magnetized strip and/or storage chip.

(III) The thickness of the cheque book is larger in the area which is allotted for the storage chip and an ordinary thickness in the rest of the area of the cheque book.

5—Type of the Used Magnetized Strip or the Storage Chip.

(I) The magnetized strip used on the ordinary magnetized paper cheques is similar to the magnetized strip used for the paper air tickets, underground tickets, and similar usage of the magnetized strip with paper.

(II) The specifications of the magnetized strip used with the magnetized plastic chip are the same specification of the magnetized strip used with plastic credit cards.

(III) The storage cheque is similar to the one used in telephone cards or credit cards.

6—The Validity Period of the Magnetized Strip or Storage Chip.

(I) The validity period of the magnetized strip merged with paper is of a less age.

(II) The validity period of the magnetized strip merged with plastic is of a longer age.

(III) The validity period of the storage chip is of a longer age than the magnetized strips.

BRIEF DESCRIPTION OF THE DRAWINGS

The drawings show examples of magnetized cheques according to the invention illustrating the visual printed particulars and the magnetized strip and/or storage chip containing stored encoded data, and illustrate a method for writing and reading the storage chips and the reader devices of the magnetized strip and/or storage chip:

FIGS. 5-1 illustrates the front side of the cheque (first form A) which is made of plastic and integrated with a storage chip from the rear face.

FIGS. 6-1 illustrates the front side of the cheque (first form B) which is made of plastic and integrated with a storage chip from the rear face.

FIGS. 7-1 illustrates the front side of the cheque (second form) which is made of plastic and integrated with a storage chip on the front face.

FIGS. 5-2, 6-2 and 7-2 illustrate the rear side of the cheque (first form A & B, second form) which is made of plastic and integrated with storage chip on the rear face.

FIGS. 8-1 illustrates the front side of the cheque (first form A) which is made of plastic and integrated with a storage chip and a magnetized strip on front face.

FIGS. 9-1 illustrates the front side of the cheque (first form B) which is made of plastic and integrated with a storage chip and a magnetized strip on the front face.

FIGS. 10-1 illustrates the front side of the cheque (second from) which is made of plastic and integrated with storage chip and magnetized strip on the front face.

FIGS. 8-2, 9-2 and 10-2 illustrate the rear side of the cheque (second form) which is made of plastic and integrated with a storage chip and a magnetized strip on the rear face.

FIGS. 12-A and 12-B illustrate the method of writing and reading of the storage chip in more detail.

FIG. 12-C is a perspective view of a device with one path to read the storage chip, and a different path to read the magnetized strip.

FIGS. 13-1 illustrates the front side of the cheque (first form A), which is made of plastic and merged with a magnetized strip from the front side.

FIGS. 14-1 illustrates the front side of the cheque (first form B), which is made of plastic and merged with a magnetized strip from the front side.

FIGS. 15-1 illustrates the front side of the cheque (second form), which is made of plastic and merged with a magnetized strip from the front side.

FIGS. 13-2, 14-2 and 15-2 illustrate the rear side from the cheque (first form A, B and second form), which is made of plastic and merged with a magnetized strip from the rear side.

BEST MODES FOR CARRYING OUT THE INVENTION

The invention pertains to a bank cheque system involving methods, and electronic systems and magnetized strips or storage chips, used to produce and issue new cheques, that reveal any forging in the magnetized cheque immediately upon introducing them for negotiation and confirm instantly whether or not sufficient funds are available, to avoid the damage that could result from forging ordinary cheques, or from the non availability of sufficient funds.

These cheques are printed bank cheques similar to those cheques which are currently negotiated, However, they are distinguished by a special new characteristic, namely merging and compacting a magnetized strip and/or storage chip in the cheque, on which all the particulars pertaining to the cheque shall be written, as disclosed herein.

These cheques are issued in different forms. A First Form is pre-paid cheques, divided into two types (A) and (B) whose front face is illustrated respectively in FIGS. 1 and 2, and issued in various categories and currencies. For Type (A) the maximum limit allowed to be paid from the account is written on the cheque. These particulars shall correspond with those included on the magnetized strip or storage chip upon printing and programming the cheque, while traveler's cheques can be issued by the type (B).

Figure 3:
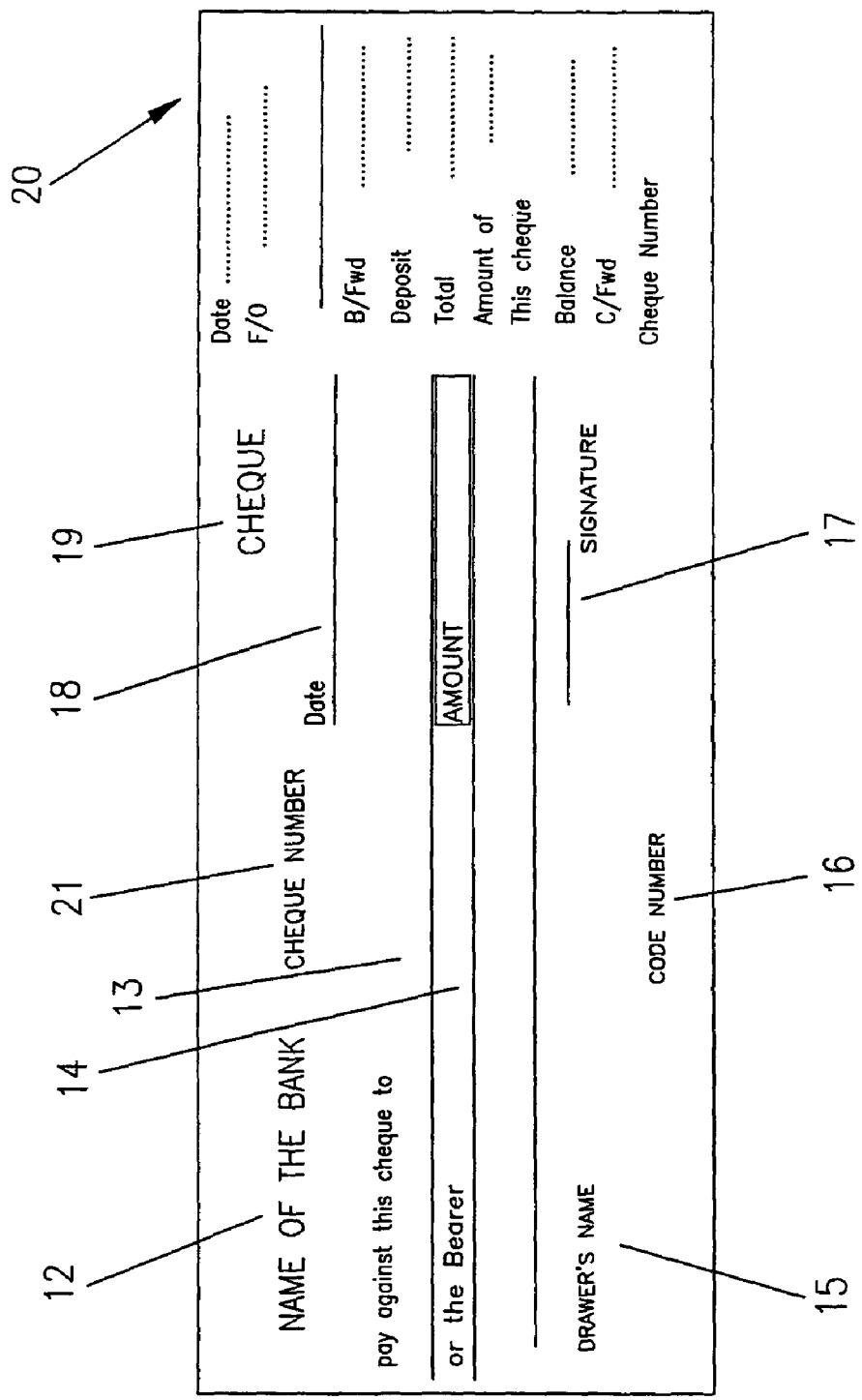
FIG. 3 illustrates the front side of the cheque (second form) and merged with a magnetized strip.

As for the Second Form, whose front face is illustrated in FIG. 3, it does not contain a maximum limit, but rather all the particulars of the cheque, the drawer and the account are programmed.

1—The First Form, Type (A)

This form contains a printed statement of the maximum value of the cheque, which is allowed to be paid from the cheque account.

Figure 1:
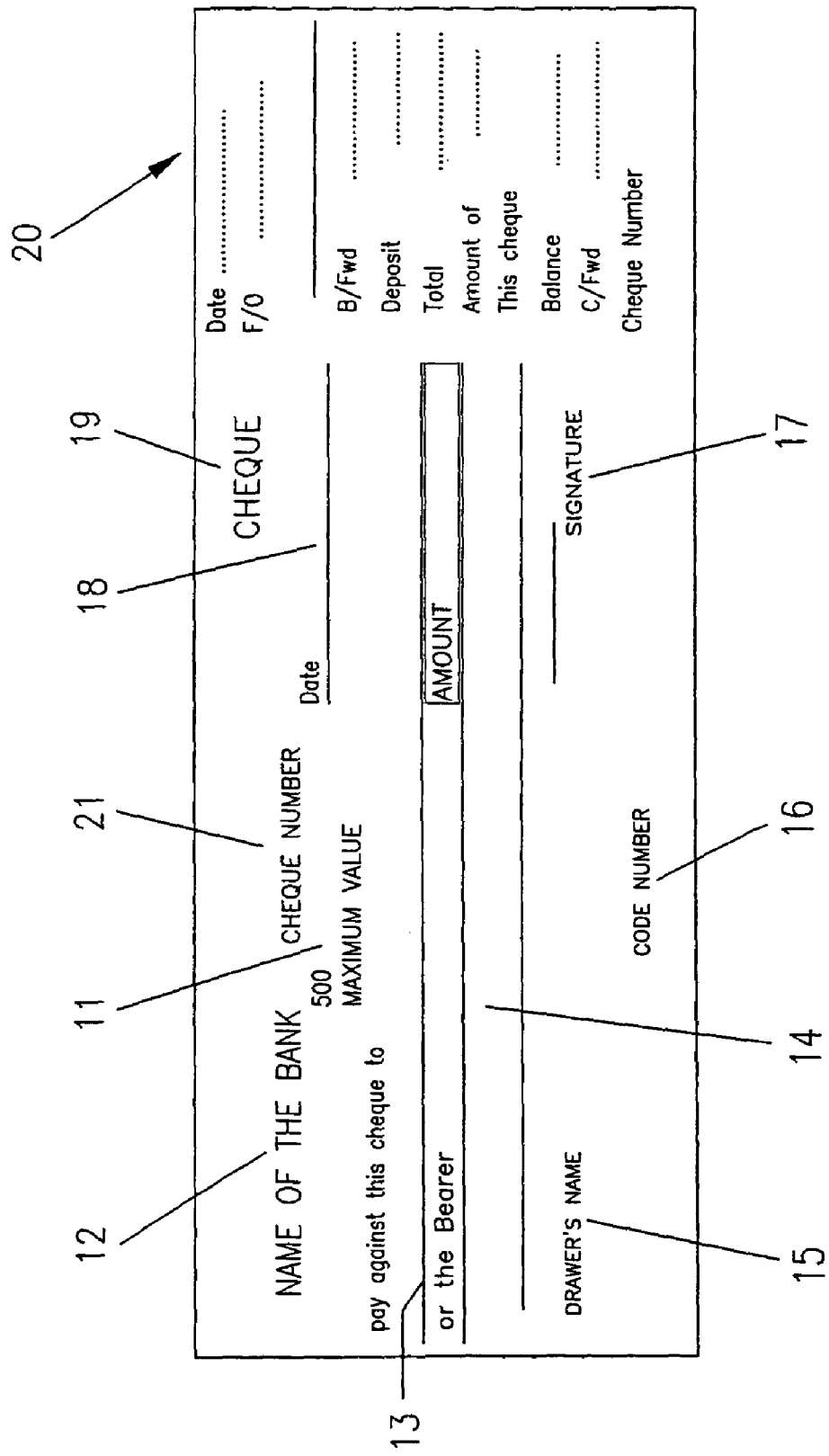
FIG. 1 illustrates the front side of the cheque (first form A) which is made of paper and merged with a magnetized strip.

The cheque is formed by a generally rectangular sheet of paper of the usual quality of cheque paper having usual dimensions of a cheque or any other selective dimensions, whose front face, shown in FIG. 1, contains formatted printed particulars, including the maximum limit 11 of the cheque (in this example 500 currency units), the name of the issuing bank 12, a location 13 for the cheque drawer to write in the name of the beneficiary, locations 14 for the drawer to write in the amount to be paid in numbers and in words, the name 15 of the drawer, the bank code number 16 which contains:—(cheque number, bank's and branch name, drawer's cheque account number), a space 17 for signature, a space 18 for entry of the date, and identification 19 of the cheque. In its right hand part 20, the front face of the cheque optionally has printed information enabling the drawer to keep track of the balance of his current account when each successive check is written. This part can, if desired, be detachable from the main part of the cheque, forming a slip that can be retained by the drawer. Finally, 21 indicates the cheque number.

Figure 4:
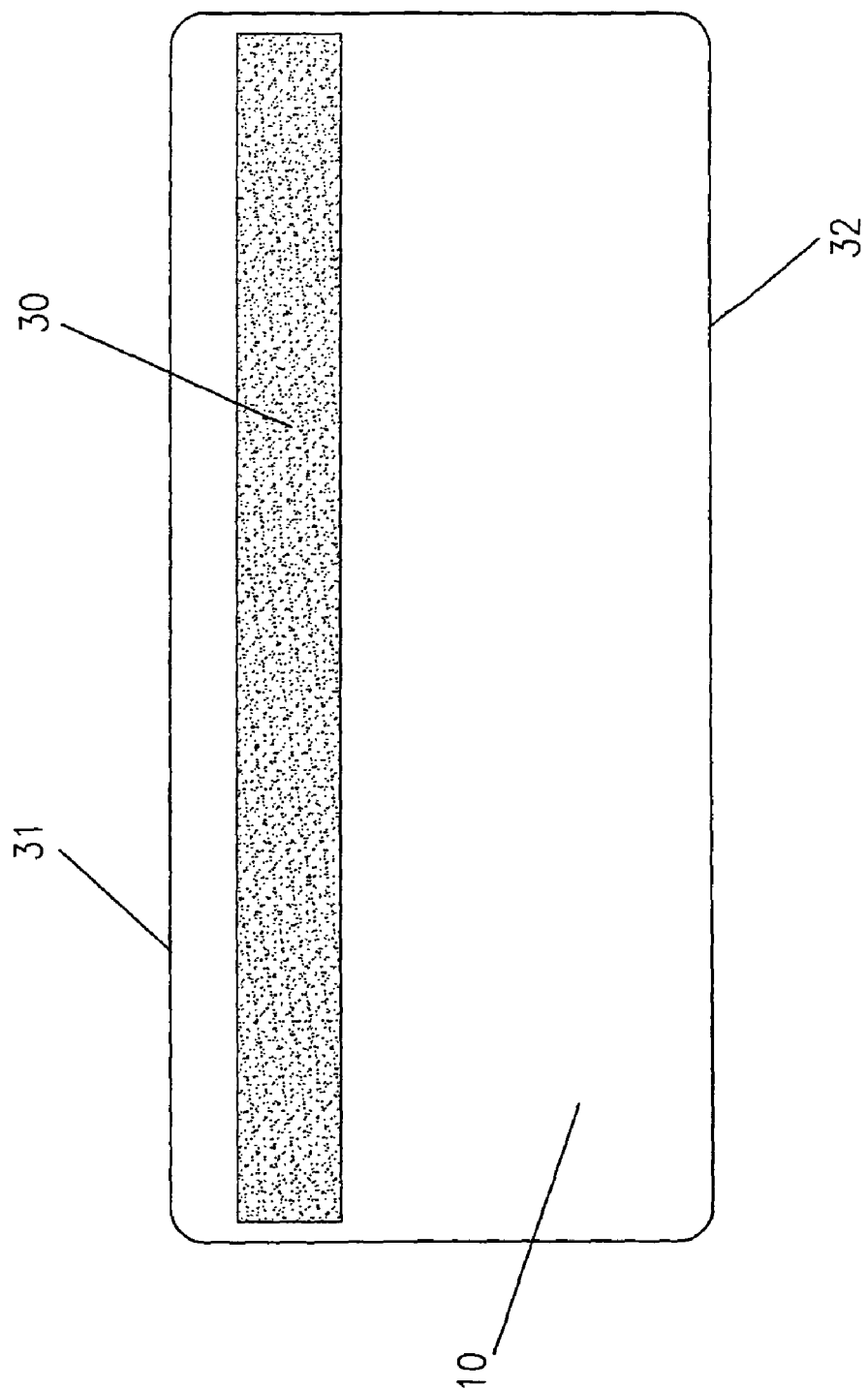
FIG. 4 illustrates the rear side of the cheque (first form A or B, or second form) which is made of paper and merged with a magnetized strip.

The rear face of the cheque shown in FIG. 4 carries an integrated magnetic strip 30 which, in this example, extends lengthwise substantially along the length of the cheque, parallel to the long edges, conveniently located closer to the top edge 31 than the bottom edge 32. Other locations are of course possible for the magnetic strip 30 provided its location corresponds to the type of magnetic reader to be used, usually a swipe reader or others. The magnetic strip 30 can be applied in any of the usual ways for comparable magnetic strips.

The magnetic strip 30 is programmed to encode data corresponding to the relevant data visible (imprinted) on the cheque's front face, including the cheque number 21, the bank code number 16, the maximum amount 11 authorized for withdrawal by a single cheque, optionally an electronic signature, etc. Optionally, some of the data encoded in strip 30 may not be printed on the cheque's front face.

To make use of this form, it is stipulated to deposit a frozen amount in the balance of the drawer's cheque. This amount shall remain blocked in the balance, and shall cover the maximum value of the number of the cheques that the bank guarantees to the client, so that the amount deposited shall be equal to the number of the cheques issued multiplied by the maximum value of each cheque. These particulars are printed in the cheque as shown in FIG. 1, and correspond with the magnetized particulars contained in the magnetized strip 30.

If post dated cheques are given regarding this form, whose maturity date has not yet been due, the banks may cash their value because its value was already paid up prior to issuing it.

In case of issuing a cheque for less than the indicated maximum value, the difference in the account between two values shall remain in favour of the drawer by leaving the same credited to his cheque account.

2—The First Form, Type (B)

Figure 2:
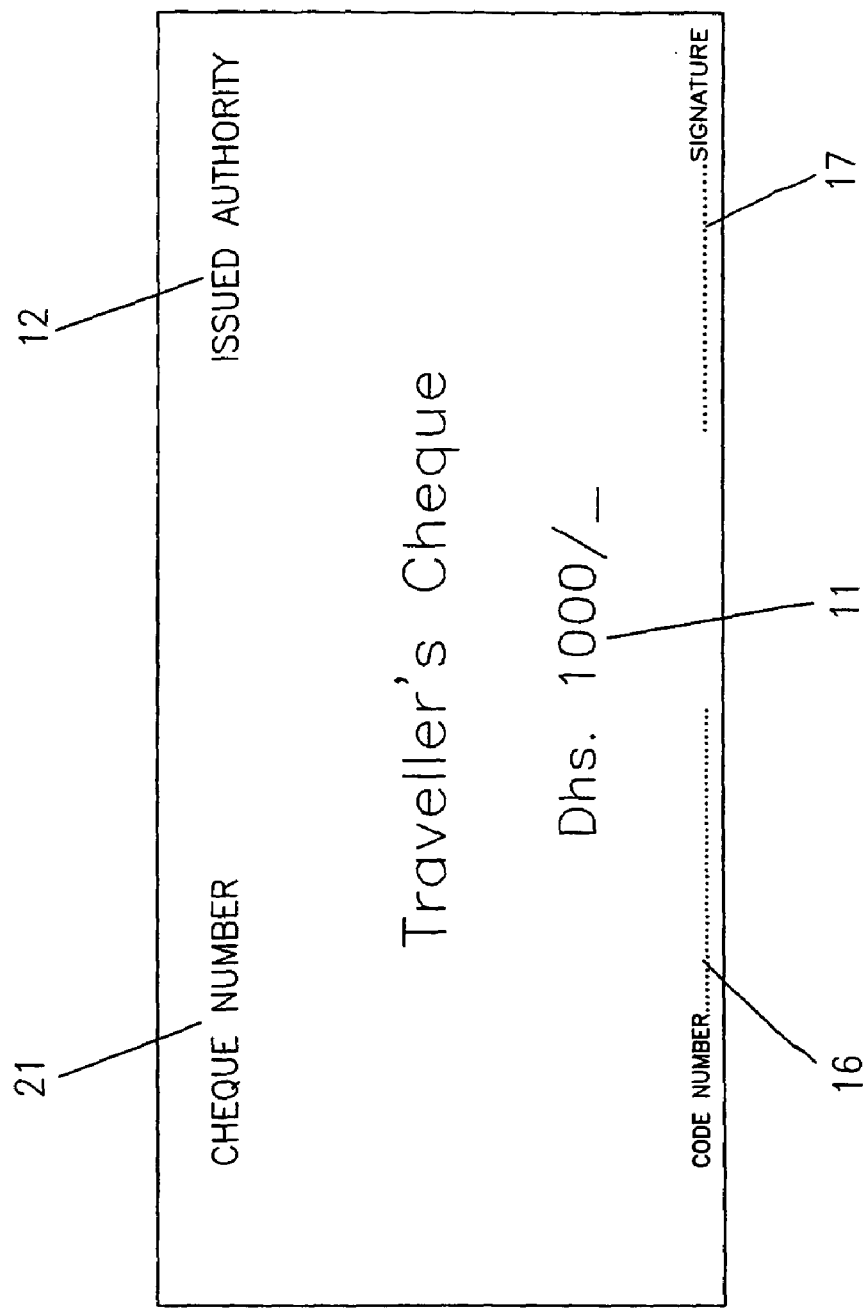
FIG. 2 illustrates the front side of the cheque (first form B) which is made of paper and merged with a magnetized strip.

This form can be dealt with as a traveler's cheque, in accordance with FIG. 2. This form specifies the actual amount 11 of the cheque which is printed on its front face, together with further particulars such as the bank code number 16 of the cheque which includes:—(the number of the cheque, bank and branch number, the number of the drawer account), signature 17, issuer authority 12, and cheque number 21. Such cheques can be issued with various categories and currencies. The given particulars are fixed and confirmed by programming the same in the magnetized strip 30, on the rear face whereby the particulars of the cheque can be read and checked for correctness through magnetic reader machines, and the telecommunications systems and computers connected with it.

3—The Second Form

Contrary to the first form (type A), this second form neither stipulates/prints the maximum value 11 of every cheque, nor does it require depositing and freezing funds corresponding to the total amount of the issued cheques. Apart from this, the front face of this cheque, as shown in FIG. 3, is similar to the first form type A shown in FIG. 1, and the same reference numerals are used to designate the same features.

The magnetized particulars in the strip 30 contain the bank code number, which includes:—(cheque number, bank and branch number, drawer account number), and the other necessary particulars imprinted on the cheque.

All this stored encoded data is readable through the magnetic reader machines connected with computers, which are in turn connected with the communication systems in the bank, where the value of the cheque is entered and the required value is automatically shifted from the current account of the drawer to the cheque account on the point-of-sale. But if the current account has no sufficient funds, the beneficiary will be able to know that immediately, and refuse the cheque.

If the value of the cheque is shifted from the balance of the drawer's current account to the balance of the cheque account, the cheque can be dealt with as a cash instrument by title and conveyance endorsement, by endorsing the same to another endorsee, and the last endorsee will be entitled to the value against clearance of the consideration, which has remained blocked in the cheque account, so he will be able to cash the same from the banks directly or by entering it as a clearance and setoff cheque in his accounts in his bank. Each successive endorsee can ascertain the existence of the balance, before accepting the cheque.

If a post-dated cheque of this form has been issued, its value will be transferred and shifted from the current account of the drawer to the cheque account, immediately upon passing or entering the cheque from the reader machine, entering its particulars, issuing the order to transfer its value from the balance of the drawer to the cheque account. The cheque account shall remain frozen up to its maturity date.

Also the balance for this form can come from the balance of the drawer by a credit facility from the bank.

If the cheque is not covered by an actual balance of sufficient funds in the holder's current account, or resulting from credit facilities, this will be found out by passing or entering the cheque though the magnetic reader machine and entering its particulars and issuing the order to transfer the value. Accordingly, the beneficiary will be able know about this fact immediately, and consequently he will be able to refuse to deal with the cheque, avoiding the consequences of accepting an insufficiently funded cheque.

Therefore, all these forms enable the beneficiary and dealers to know about the correctness of the balance, the genuineness of the particulars of the cheque, and the order to transfer the value of the cheque from the balance of the drawer to the account of the cheque, through the magnetic reader machines and the aforementioned computers connected with telecommunications systems, in a similar way to transactions with magnetized "Credit Cards".

In case of any alteration of the printed particulars of the cheque, non-correspondence with the stored encoded data will immediately reveal any forgery on the cheque or the non availability of sufficient funds, so the beneficiary can avoiding dealing with this cheque, and is protected from the previously described risks.

The Method of Production of the Magnetized Cheques

The magnetized cheque is produced through printing the paper of the cheque by conventional methods, for example in accordance with the aforementioned forms illustrated the attached drawings and merging and compacting the magnetized strip in any part of its surface so it will not be possible to remove it, and in which it is possible to store the confidential data, through programming, as described later.

This data includes code number of the bank which contains:—(the number of the cheque, the number of the bank and branch, the number of the cheque account) and the maximum amount of the cheques in the first form (A), or the actual amount in the travelers cheque issued by the first form (B), or any other necessary particulars printed on the cheque. Additional technology can be added regarding coded confidential data on the signature. The printed paper of the cheque with the magnetized strip will be in one single unit, all the confidential particulars and data being coded in the magnetized strip, in the same as for magnetized credit cards.

The proposed technical solution depends upon fixing a magnetized strip 30 on any portion of the cheque. As the paper of the cheque and the magnetized strip constitute a single unit, both of them together constitute and form the magnetized cheque whose magnetized strip may be read through the aforementioned reader machine. Through this operation, it is possible to ascertain the correctness of the value of the cheque, the availability of the required funds (balance), detaining its value directly and issuing a receipt that confirms the same. The system optionally allows electronic scrutinizing of the cheque issuer's signature to ascertain its correctness.

The Processing Steps:—

The processing steps start by receiving the cheque and visually checking for the absence of any ensure, deletion, or difference between the value in words and value in figures, by the know manual methods.

Then, for cheques of the second type, the cheque will be passed through the reader device/unit, the cheque amount having been entered into the cheque. The reader machine in turn makes sure of the correctness of the confidential information and particulars stored in the magnetized strip. The reader machine is connected to the main banking control system (File Server) of the concerned bank. Through the computer systems with which it is connected and sophisticated developed network systems, the particulars which were read and entered will be examined to make sure of their correspondence with the particulars available on the systems of the banks participating in this service. Particularly, the correctness of the cheque, the number of the account, and the availability of sufficient funds and balance are checked, In case of successfully fulfilling these steps, the required amount will be detained (in the blocked cheque account) and associated with the number of the cheque, and the date of this transaction determined. Then the transfer will be confirmed, and a receipt issued.

The amount of the cheque will remain detained (blocked) until all these steps are successfully completed, so the transaction pertaining to the magnetized cheque can only be finalized and completed by submitting the cheque to the bank and obtaining the bank's approval as outlined above. Moreover, the computer system advantageously allows electronic scrutinizing of the cheque issuer's signature to ascertain its correctness, directly thorough reviewing and displaying the signature on the computer screens.

The cheque issuer's signature may be an electronic signature expressed by a set of codes, letters, numbers, which image could be kept and entered into the magnetized strip itself.

To achieve similar benefits relating to security as those previously described, in particular a copy of the signature (image), the thumb impression, or copy or the personal photograph of the cheque issuer, the reader system shall be capable to read and display the stored images, for example it can be connected with a PC through which the stored images could be read.

The magnetic reader could be the same system, or similar to the system used in reading the Credit Cards, or so-called Point-Of-Sale (POS) systems (in particular swipe readers), with the capacity of reading the magnetized strip, or a personal computer (PC) having a unit for reading the magnetized strip, or hand-held readers.

In case of non-existence or non-availability of sufficient funds, incorrectness of the cheque, or incorrectness, or the non-correspondence of the particulars of the cheque with those stored in the magnetized strip, the reader will provide a visual display and/or issue an advice in the form of a printed slip.

Upon delivering the cheque to the bank for collection (after the above-described procedure has been completed), the amount will be released and cashed in accordance with its due date.

Therefore, by implementing, and applying the invention and using magnetized cheques, the following results will be achieved. The service of receiving, checking and detaining the value of the cheques is carried out automatically, directly, precisely, soundly, and correctly, as well as all the required controlling and checking reports, whether from the official controlling authorities such as the Central Bank, through the internal controlling authorities of the commercial banks. Moreover, this service is made available to a large number of participants and subscribers worldwide, due to the need of implementing and applying the system on the international level, and due to the availability of the required technology.

The Embodiments of FIGS. 5 to 10 and 13 to 15

FIGS. 5 to 10 show further embodiments of the cheque according to the invention, made of plastic. In these Figures the same references are used to designate the same features as before, and the corresponding description will not be repeated. These plastic cheques all include a thick end portion 32 in which a storage chip 33 is merged, accessible from the front face, or the back face, or both. As illustrated, the storage chip 33 is located centrally in a generally rectangular protruding thick tongue, which is narrower than the main part of the cheque, this special shape being designed for cooperation of the cheque with a storage chip reader. However, it is understood that the cheque with a thick end part can have other shapes, or the thick part can be situated at different locations of the cheque.

Figures 1, 5:
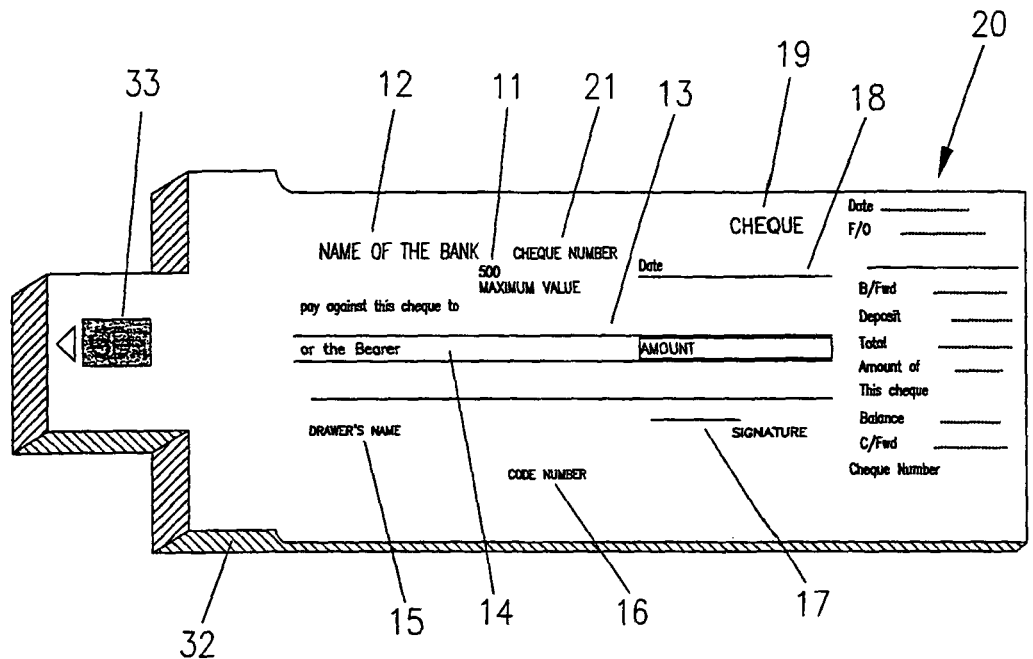
Figures 2, 5:
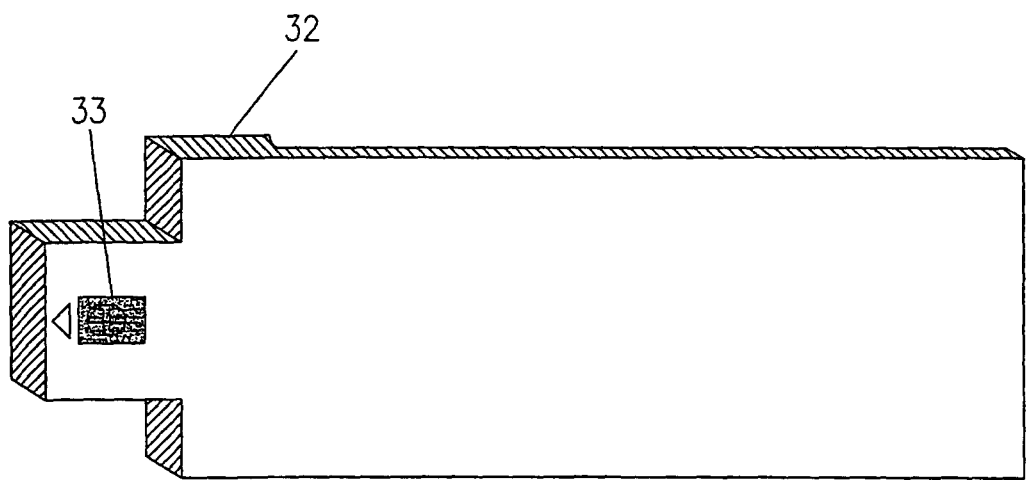
Figures 1, 6:
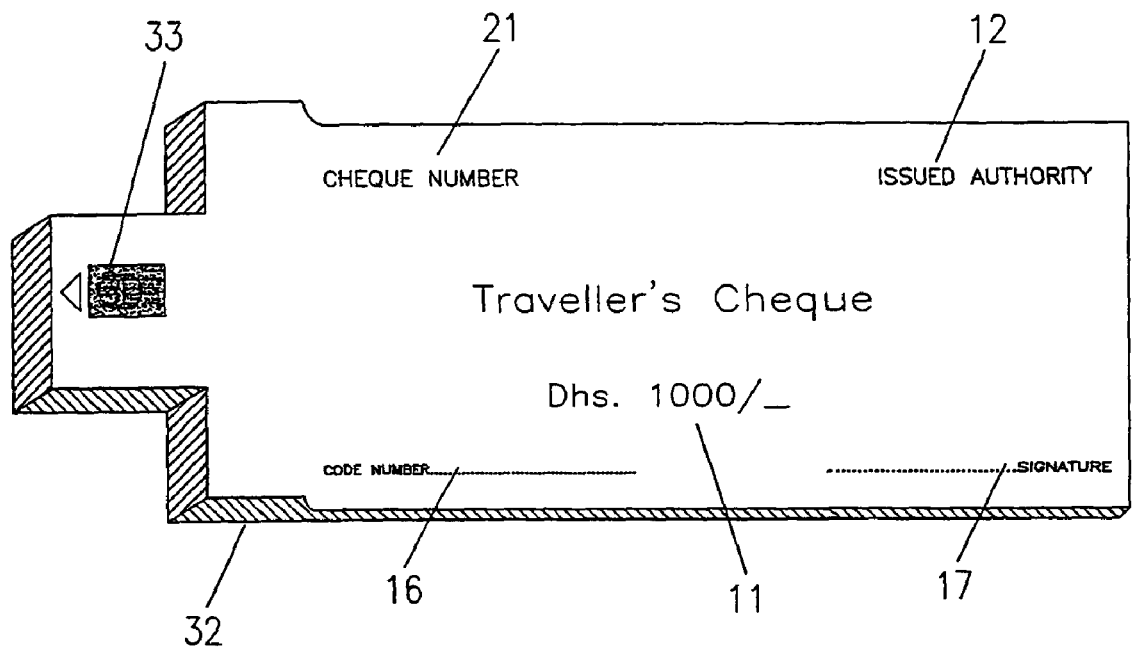
Figures 2, 6:
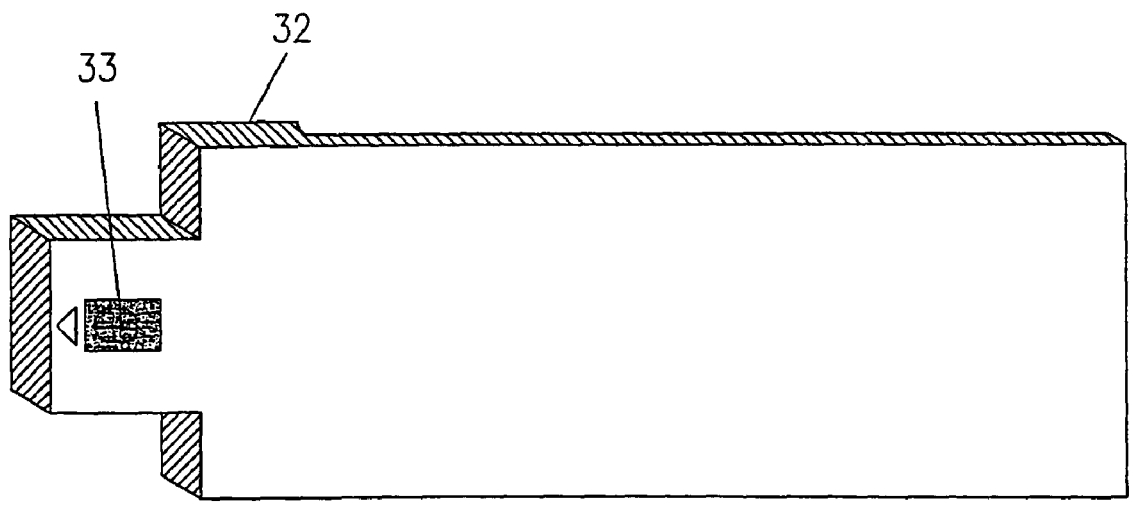
Figures 1, 7:
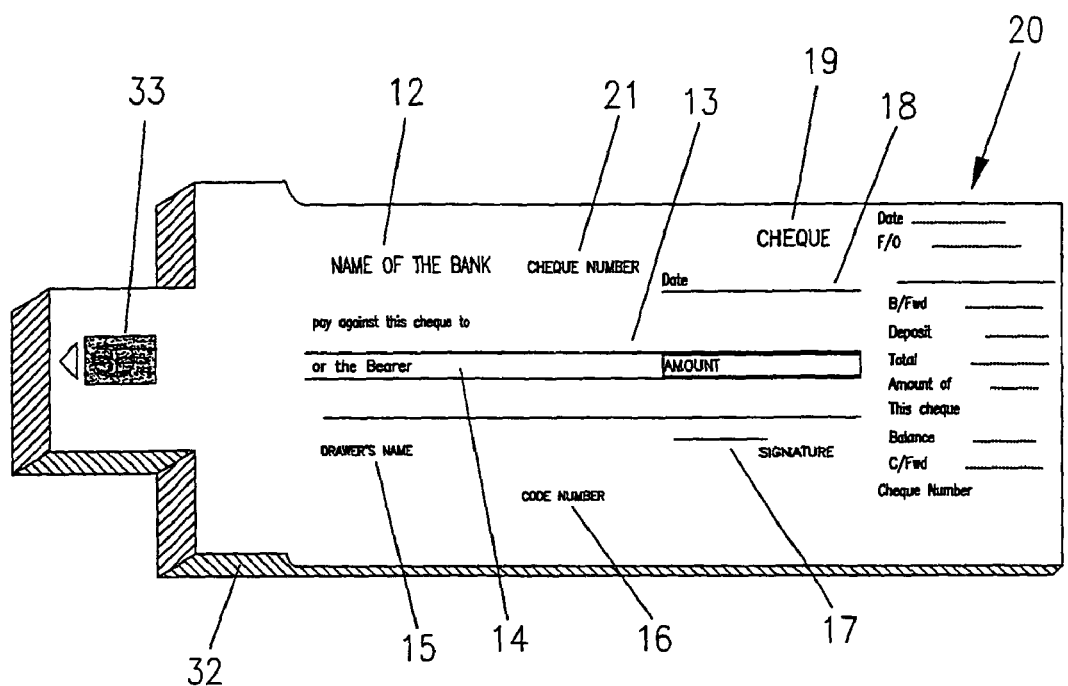
Figures 2, 7:
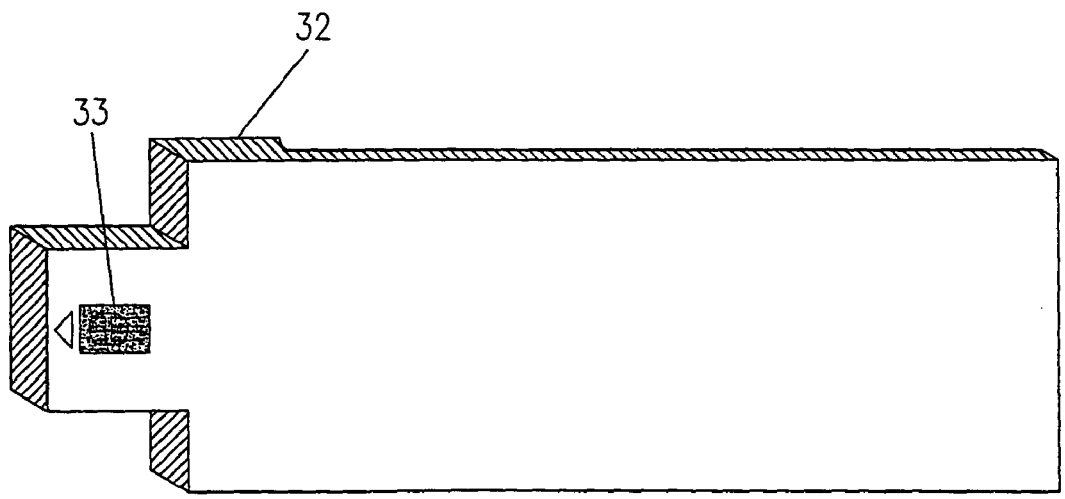

FIGS. 5-1/5-2; 6-1/6-2 and 7-1/7-2 show respectively cheques of the aforementioned types: first form A, first form B and second form, all of which have a storage chip 33 as their sole means for storing the stored encoded data.

Figures 1, 8:
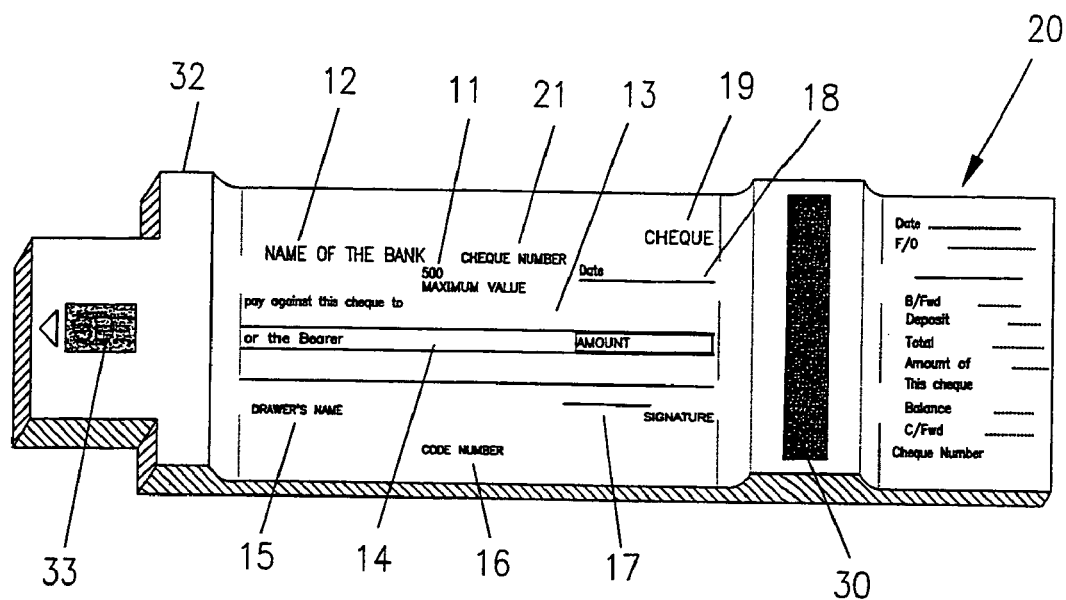
Figures 2, 8:
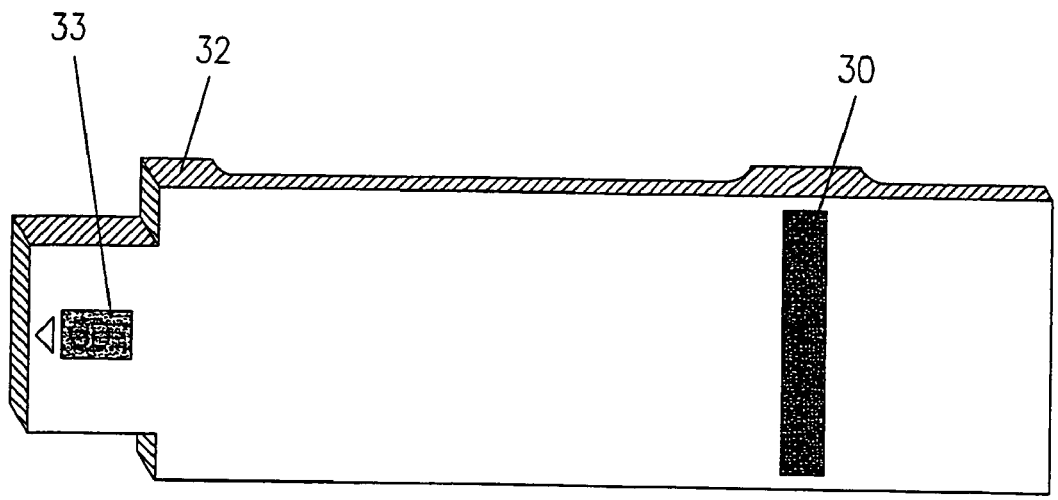

On the other hand, FIGS. 8-1/8-2; 9-1/9-2 and 10-1/10-2 show respectively cheques of the aforementioned types: first form A, first form B and second form, wherein a magnetized strip 30 and a storage chip 33 are merged in a single cheque.

Figures 2, 13:
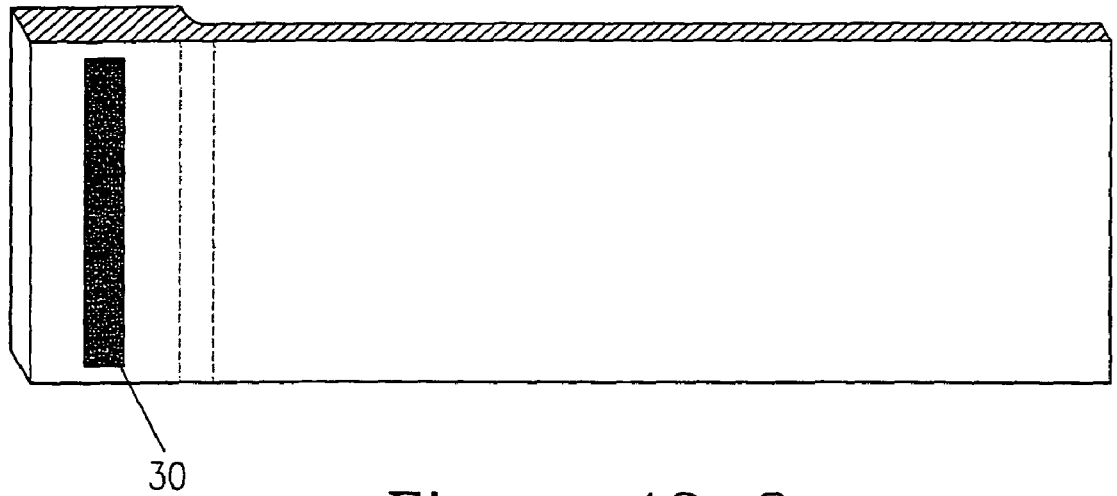
Figures 1, 13:
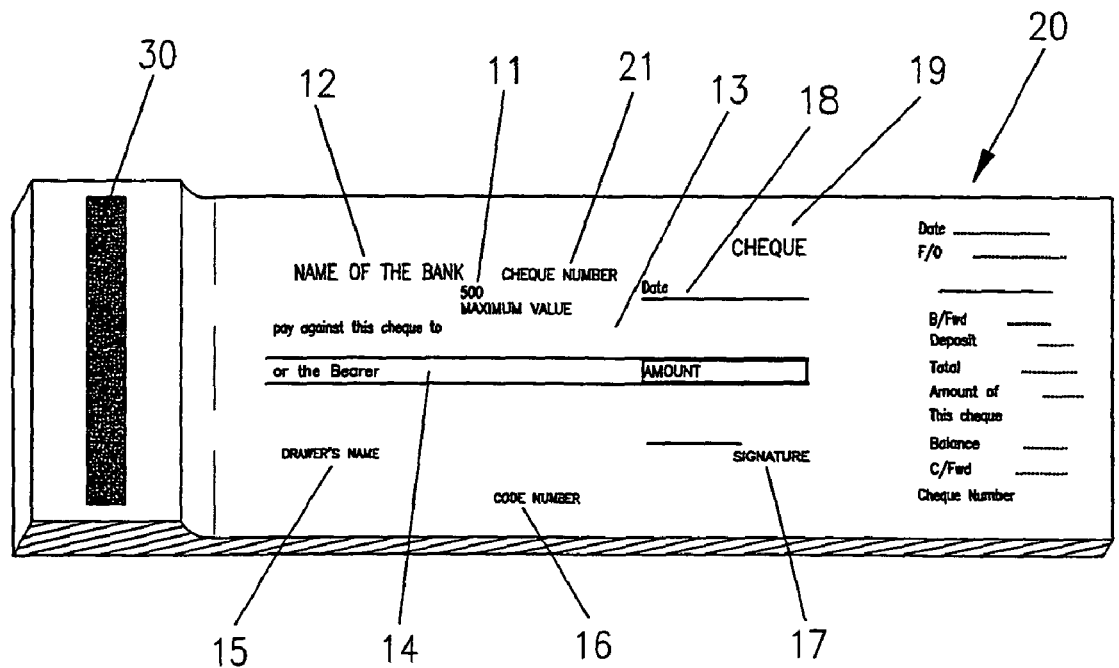
Figures 2, 14:
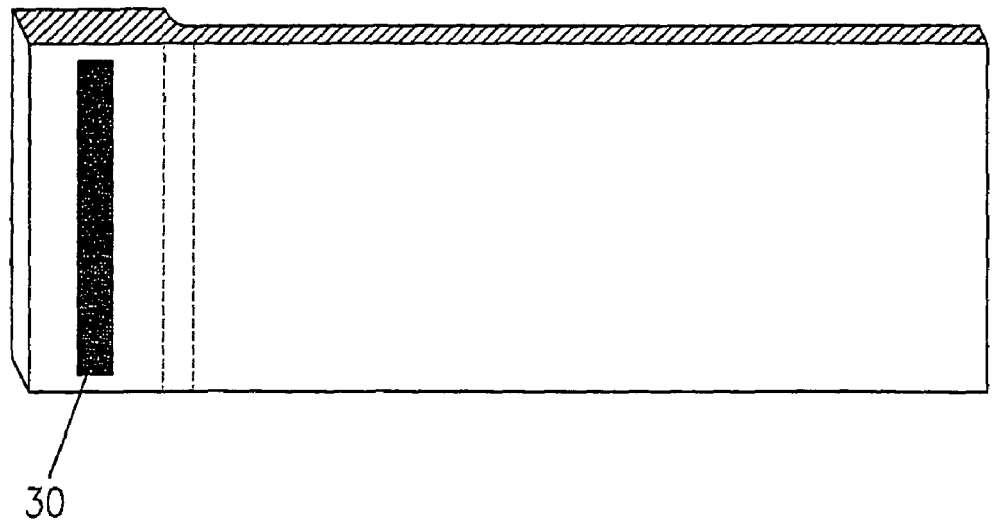
Figures 1, 14:
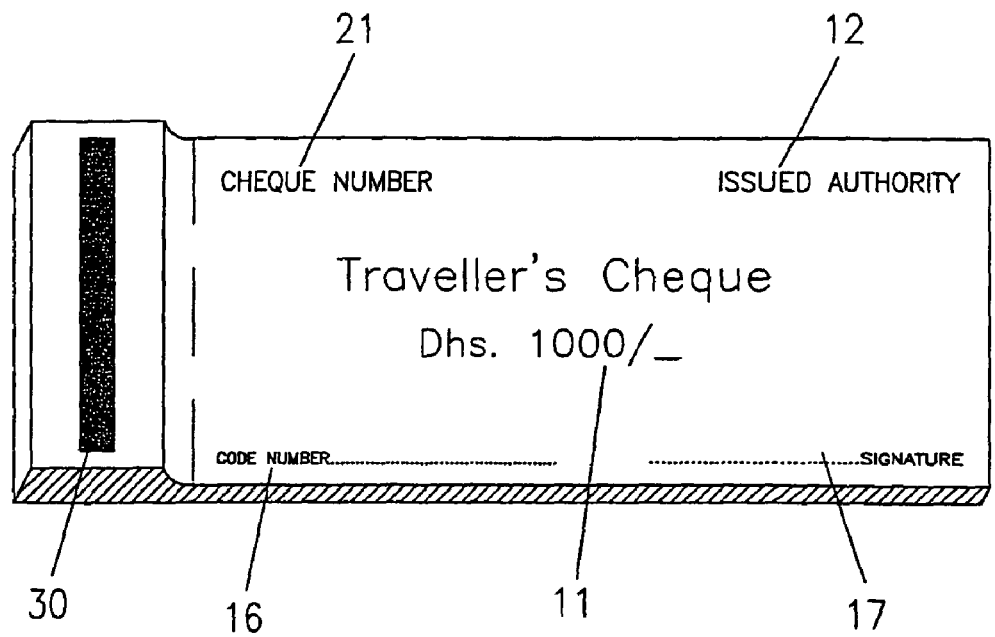
Figures 2, 15:
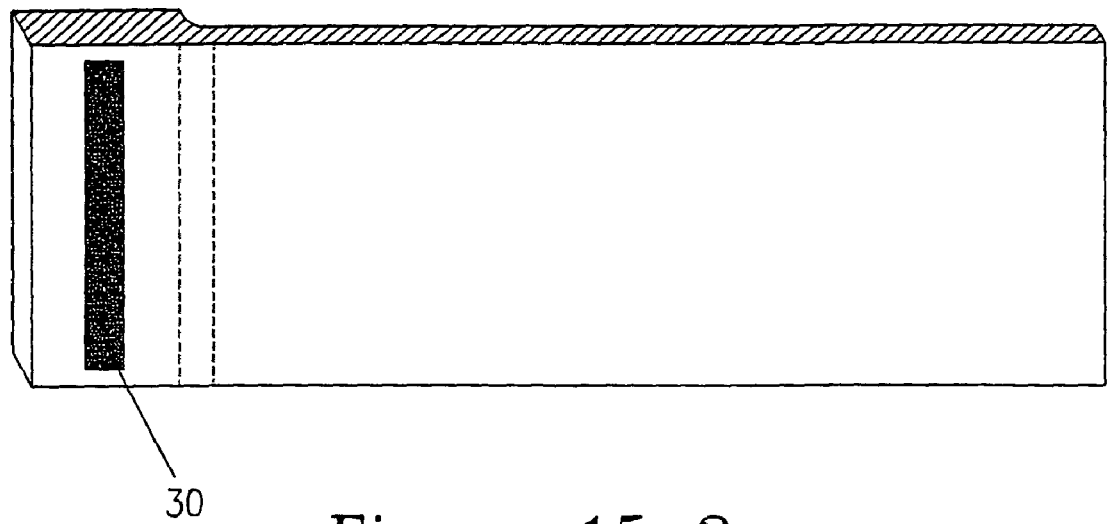
Figures 1, 15:
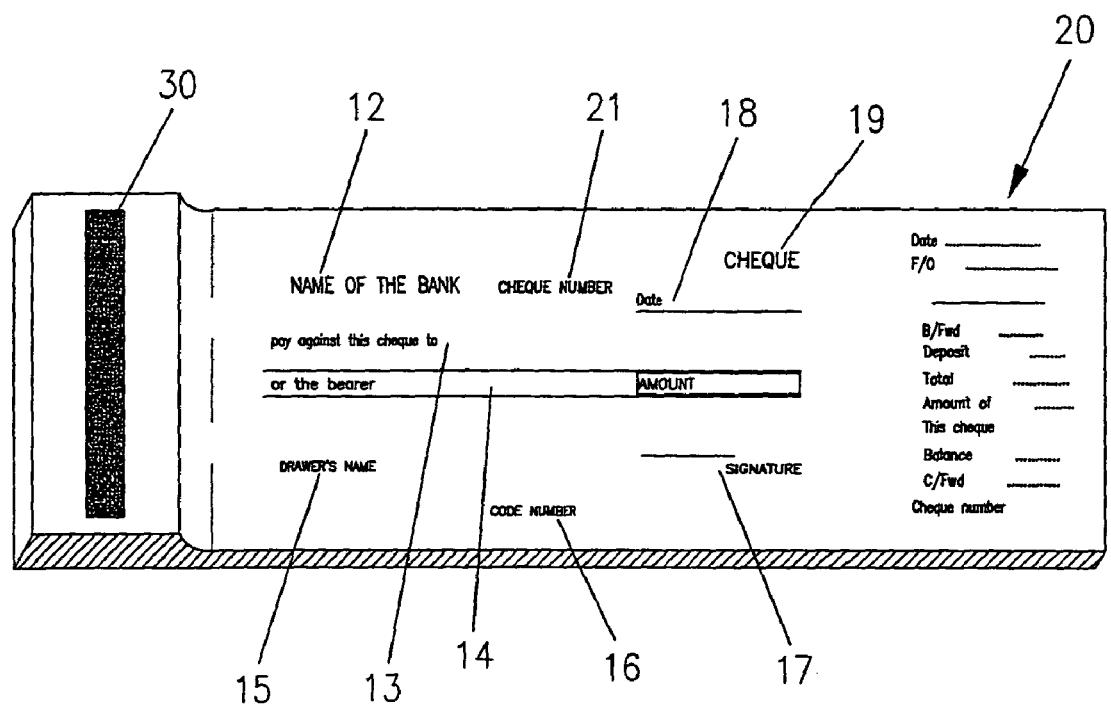
Figure 16:
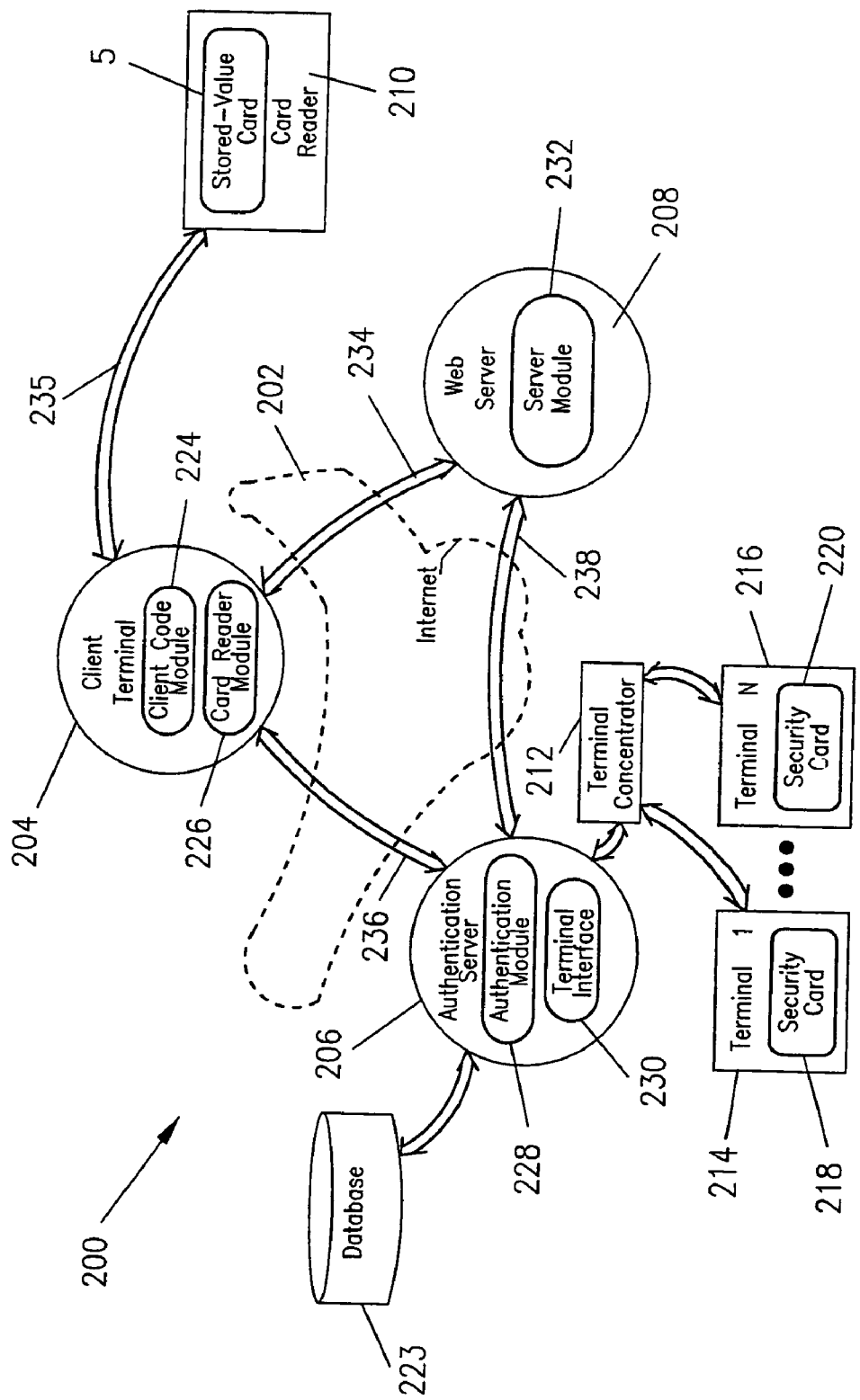
FIGS. 16 & 17 illustrate an internet payment and loading system of EP Patent 1 003 139, as discussed above.
Figure 17:
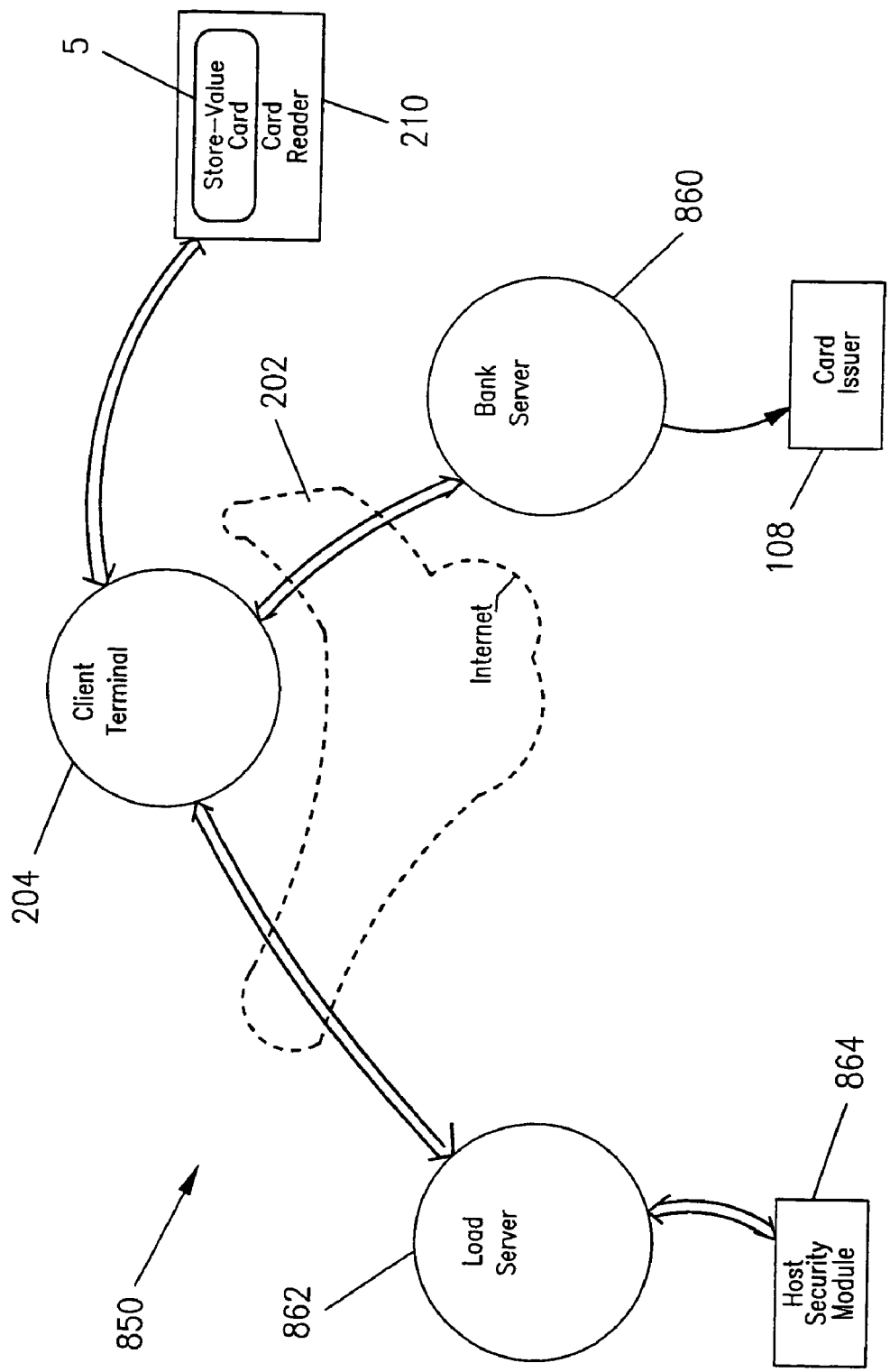

FIGS. 13-1/13-2; 14-1/14-2 and 15-1/15-2 show respectively cheques of the aforementioned types: first form A, first form B and second form, wherein a magnetized strip 30 is provided, as their sole means for storing the stored encoded data, this strip being merged in a single enlarged end of the cheque.

As illustrated, the magnetized strip 30 can be on a thick part of the plastic cheque situated at an intermediate location along the cheque (adjacent the end part 20, FIG. 8-1) or at an end of the cheque, opposite to the end with the storage chip 33 (FIG. 9-1), or at an end of the cheque opposite to the end with the end part 20 (FIGS. 13-1, 14-1 and 15-1).

Figures 1, 9:
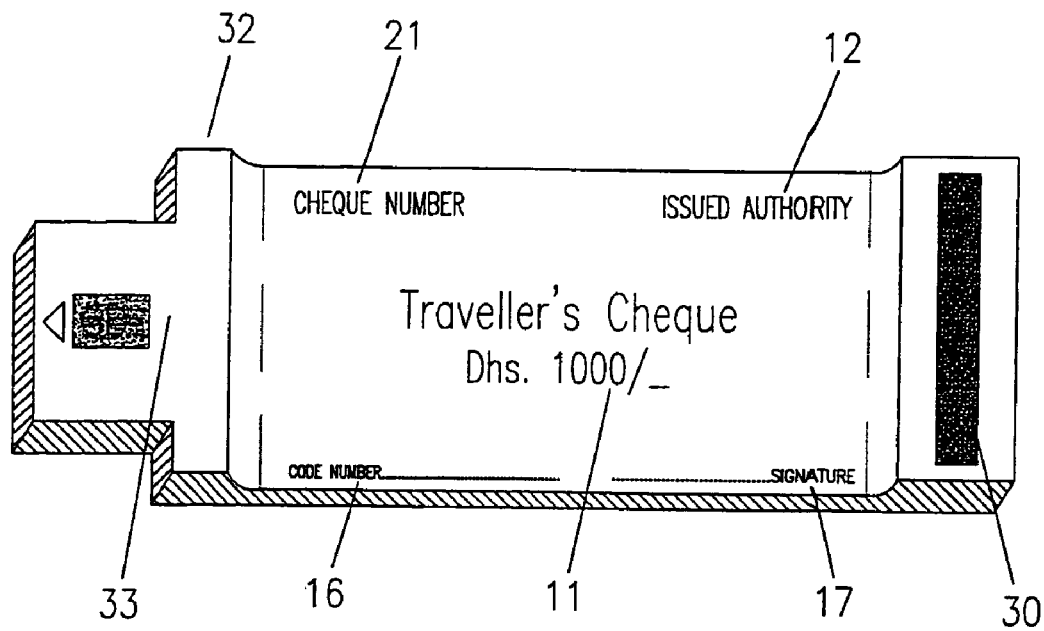
Figures 2, 9:
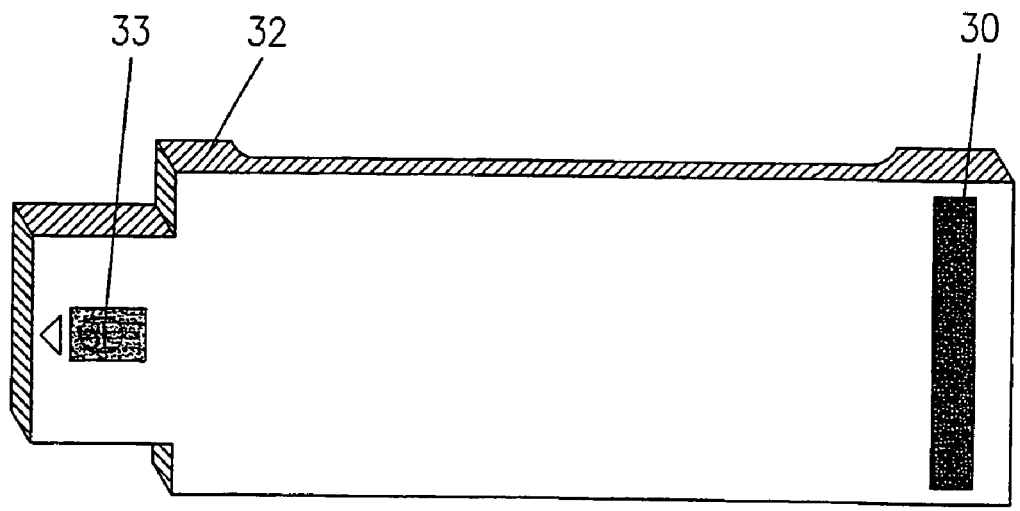
Figures 1, 10:
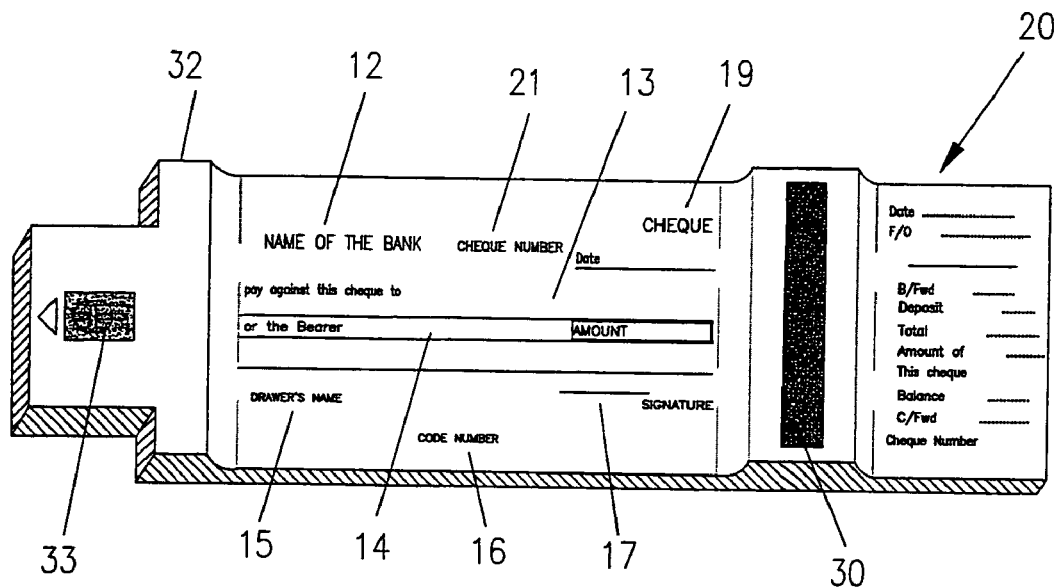
Figures 2, 10:
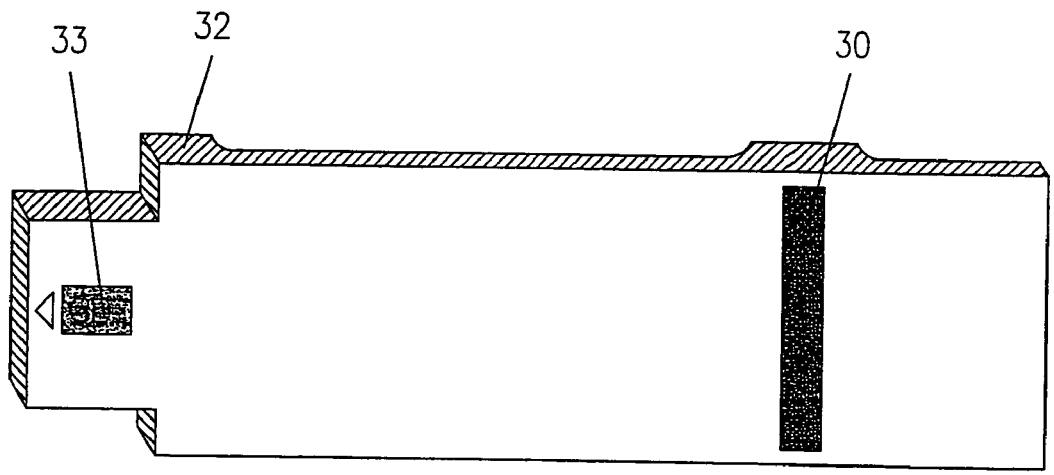

Currently in the market, there are devices can read both of the magnetized strips 30 and storage chips 33 through special paths for each one separately (as shown in FIG. 12-C). These devices used to read the card with magnetized strips 30 and storage chips 33, can be used also to read the cheques with magnetized strips only (FIGS. 1 to 4); or cheques with storage chips only (FIGS. 5 to 7), or cheques with both magnetized strips and storage chips (FIGS. 8 to 10).

The Method of Writing and Reading the Storage Chip

Figure 11:
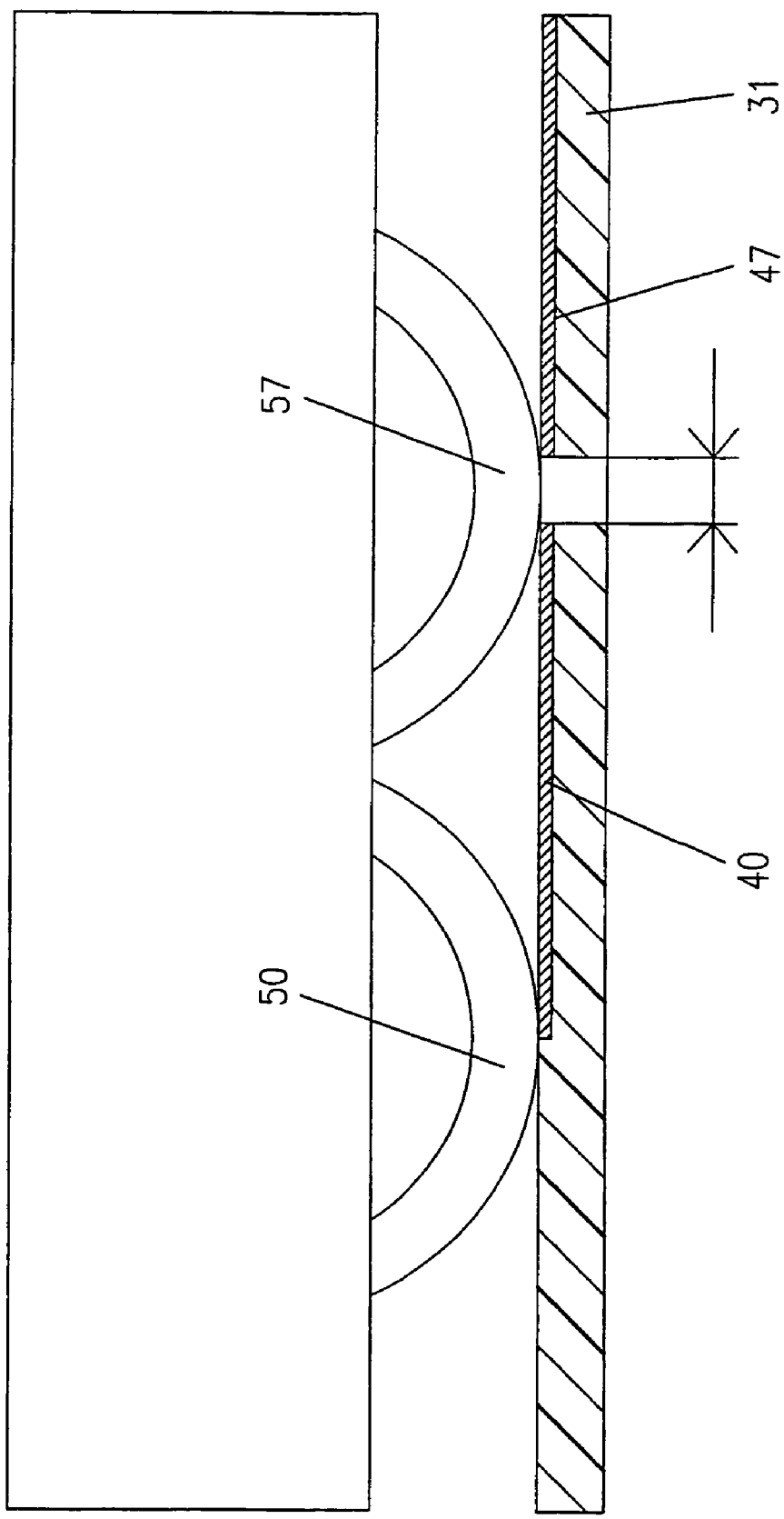
FIG. 11 illustrates a method of writing and reading of the storage chip in general.

FIGS. 11, 12-A and 12-B illustrate the principle of a method for writing and reading stored encoded data in the storage chip in general, as is known from U.S. Pat. No. 6,112,997, which was unpublished at the time of our first filing date on May 12, 1999. In these Figures, reference numeral 31 indicates a plastic cheque with a microchip module 33. On the surface of the plastic cheque 31, in the region of the microchip modules 33, eight contacts 41,42,43,44,45,46,47 are mounted and connected electrically conductively to the microchip. They serve to provide electrical contact with eight corresponding fixed countercontacts 50,57 of a plastic cheque reader that has a slot for receiving the plastic cheque 31. In FIGS. 12A and 12B the electrical contacting of the first and eighth contacts 40 and 77 of the plastic card 31 with the first and eighth countercontacts 50 and 77 of the plastic cheque reader is shown. The countercontacts 50, 57 are electrically conductively connected to a microprocessor 60 of the plastic cheque reader. The contacts 40,47 on the surface of the plastic cheque 31 are arranged such that two contacts each in the insertion direction, indicated by an arrow, and four contacts each crosswise to the insertion direction are disposed side by side. In FIGS. 12A and 12B, the plastic cheque 31 is introduced lengthwise into the card slot of the card reader. However, it is also conceivable for the plastic cheque 31 to be introduced widthwise into a corresponding cheque slot. In that case, the arrangement of the contacts 40, 47 on the surface of the plastic cheque 31 would have to be rotated by 90°. From what is shown in FIGS. 12A and 12B, it does not matter hereinafter whether the plastic cheque 31 is to be introduced into a slot lengthwise or widthwise, since the disposition of the contacts 40,47 in the insertion direction is always the same. By means of the electric contacting of the contacts 40,47 with the corresponding countercontacts 50,57, writing and/or reading operations on the microchip of the plastic cheque 31 are possible with the aid of the microprocessor 50.

FIG. 12C, illustrates an embodiment of a reader 61 having the usual keypad 62, electronic display 63 and printer output 64. The reader 61 is provided with two paths for reading magnetized strips and storage chips, namely an open-ended swipe groove 65 through which cheques with magnetized strips 30 can be passed or "swiped", and a slot 66 for the introduction of the end of a cheque provided with a storage chip 33.

The Banking Control System

To apply the invention many available technological elements are implemented in the banking control systems, including:

(1) A Mid-Range Server, on which the main database is stored, and pertaining to the various transactions that will be executed among the various banks and financial instructions, to execute the operation of the required financial transfer, handling and settlement.

(2) Relational Database Management System (RDBMS) containing all the particulars and data pertaining to the cheques, together with the transactions to be executed, the bank codes, the reader units and others.

(3) Communication Devices, through which connection will be made between the aforementioned Mid-Range Server and the below-mentioned sub-servers, using various types of communications, including Dial-Up, Leased Line, ISDN, etc.

(4) Fire Walls, though which monitoring and controlling all the communications with the Mid-Range Server will be made, eliminating any unauthorized entry.

(5) The above-mentioned elements will be available, and will be installed within a Main Processing Center pertaining to the authority in-charge of the new bank cheque system according to the invention, for carrying out all transactions pertaining to it.

(6) A sub-Server, which is a computer which will be installed with every one of the banks participating and subscribing to the service of the bank cheque system of the invention, on which the data and particulars pertaining to the subscribers will be stored, together with the numbers of the new cheques issued by the bank and the same will be associated with the accounts of the clients, etc.

(7) Sub-Relational Database Management Systems (RDBMS): theses bases will contain such data and particulars mentioned in (6), each confined in the clients of the particular bank only.

(8) Sub-Communication Devices through which connection between the server mentioned in (6), and the reader systems and processing systems mentioned hereunder, together with the sub-server mentioned in (6), will be made.

(9) Sub-Fire Walls, namely systems for protecting, monitoring and controlling the entries made to the systems mentioned in (6).

(10) The elements from (6) to (9) above will be installed with every bank that participates and subscribes to the services of the bank cheque system of the invention.

(11) New cheque reader systems, namely units and systems that will be installed with the various parties that handle and make transactions with the new cheques, including shops, businesses, companies, and hotels.

(12) The above-mentioned reader systems will be connected with the sub-server mentioned in (6), through communication systems that allow the above-listed types of connection.

(13) The reader systems will contain a reader for the magnetic strip and/or stored chip integrated in the cheque, together with a keyboard, through which the data and particulars pertaining to the transactions to be executed will be entered, as specified herein.

(14) The new cheque is a bank bond issued by an approved bank which is participant and subscriber of the services of the bank cheque system of the invention, this cheque being constituted of the paper or plastic or other material together with the integrated magnetized strip and/or stored chip.

(15) All the above-mentioned elements from (1) to (13) will be connected together, through an integrated communications network, as specified above.

Practical Application of the Invention

The practical implementation of the bank cheque system according to the invention is illustrated by way of example in the following steps:

Step 1: The client initially applies with his bank, which is a participant and subscriber to the bank cheque system, to obtain a cheque book after paying the bank's charge.

Step 2: The bank then issues the required cheque book, in accordance with the data and information approved by it, the cheque book containing a certain number of the new paper/plastic cheques each having a magnetized strip and/or storage chip including identification data such as: number of the cheque, number of the account, and the necessary security control elements.

Step 3: The client receives the new cheque book, issued in accordance with the data and information approved by the bank.

Step 4: The Client, upon receiving the new cheque book, handles and issue new cheques to the beneficiary in the same way as with ordinary cheques.

Step 5: The beneficiary shall scrutinize and check the particulars of the cheque, to make sure that they had been duly completed and that there are no erasures, as for conventional cheques.

Step 6: The beneficiary shall then pass the new cheque through the reader system, to make sure of its correctness, and for the purpose of booking the amount provided and mentioned within the new cheque directly from the cheque account of the drawer, whereas the beneficiary enters the required amount to be blocked through the keyboard. The amount and the particulars of the cheque will be processed with the following steps (07) to (11):

Step 7: The reader system will then read the data provided in the magnetized strip and/or storage chip to enable verification of the correctness of the cheque, particularly regarding the number of the cheque, and the security elements installed in the new cheque, that confirm the correctness of the cheque and security information.

Step 8: The reader system will connect with the sub-server, to communicate the information and data pertaining to the cheque, to make sure of its correctness.

Step 9: The sub-server will process the data received from the reader and pass it through the respective database, then it forwards a reply electronically as regards the correctness and soundness of the cheque that was actually issued by this bank.

Step 10: In case of issuing the cheque by another bank, the transaction will be passed from the sub-server to the Mid-Range Server which contains an inclusive database containing all the particulars of all cheques issued by all banks participating in the bank cheque system according to the invention. Then this transaction will be passed to the concerned bank, so that full matching and verification will be made.

Step 11: The result will be transmitted to the reader system, so the beneficiary will be able to make sure whether the cheque is correct or not, and to refuse the transaction if the cheque not correct.

Step 12: In case of correctness of the cheque, the reader system will issue a message to the beneficiary of the completion of the operation and transaction. Then upon the arrival of the value of this amount to the sub-server pertaining to the client, the system will directly freeze the required amount and will enter into the database this amount which is blocked, effective from the date of the transaction, and the number of the cheque, together with the number of the transaction.

Step 13: After completing all the above steps, the reader system will deliver a slip showing the full results of the transactions, and these results will be given in duplicate, one copy to the drawer and one copy to the beneficiary.

Step 14: The collection of the value of the cheque and the blocked amount will be made, either electronically and directly similar to any bank transaction, or the amount will remain blocked and frozen until the beneficiary inquires to the bank and produces the cheque and advice (slip) mentioned in step 13 above, so that the bank will be able complete the required operation and transaction, and the bank can collect a charge fee from the participant in this system as mutually agreed charge.

This invention thus provides a bank cheque system and method and new bank cheques that enable ready verification of any unauthorized alterations to the cheque, and wherein the cheque completed with the amount to be paid can be guaranteed as a cash instrument, thanks to the verification made possible by the magnetized strip and/or storage chip that the amount of the cheque has been blocked or frozen in the cheque account. The invention permits the execution of all banking processing concerning cheques in more safety and security.

Many modifications are possible within the scope of the appended claims. For example, the magnetized strip or storage chip could be merged in any suitable place on the front or rear side of the cheque. These cheques issued in different categories, and various currencies. The thickness of the cheque in the merged area of the magnetized strip and/or storage chip should be according to the standard specification of the reader and writer devices.

The invention claimed is:

1. A bank cheque system comprising issued bank cheques each having a front face carrying imprinted and written visible data, a rear face for endorsement, and a storage chip in which invisible data is encoded on the front and/or rear face, the issued cheques each comprising a flexible thin portion carrying the imprinted and written visible data and a thick portion wherein the storage chip is merged, the storage chip being merged in a surface of the thick portion of the cheque such that said surface of the thick portion extends from opposite sides of the storage chip whereby the storage chip is situated between different surface parts of the thick portion and occupies only a part of the surface area of the thick portion, the flexible thin portion of the cheque that carries visible data extending from the thick portion, the rear face of the flexible thin portion being left for endorsement, the stored encoded data stored in the storage chip in the thick portion of the cheque being readable by means of a suitable reader so its conformity with visible data carried by the flexible thin portion of the cheque can be verified to detect any unauthorized alterations to the cheque, the stored encoded data including an identification of a cheque, bank and an account containing blocked funds available for the cheque to be paid or endorsed as a cash instrument, wherein:

(i) said imprinted and written visible data carried by the flexible thin portion of the cheque and said stored encoded data stored in the storage chip each indicate a value of the cheque, said value being covered by a pre-paid amount credited to the cheque account; and/or (ii) said imprinted and written visible data carried by the flexible thin portion of the cheque and said stored encoded data stored in the storage chip each identify a current account from which the cheque account can be funded to cover said sufficient blocked amount on presentation of the cheque and after ascertaining, by passing or entering the cheque though a reader connected to a banking control system, and entering the value of the cheque, that the current account has a sufficient credit.

2. The bank cheque system of claim 1, comprising cheques as defined in sub-paragraph (i) wherein said imprinted and written visible data carried by the flexible thin portion of the cheque and said stored encoded data stored in the storage chip each indicate a maximum value of the cheque, said maximum amount corresponding to the cheque account should not be exceed the real amount of the cheque upon issue, and in which the amount deposited is equal to the number of cheques issued multiplied by the maximum value of each cheque.

3. The bank cheque system of claim 1, comprising cheques as defined in sub-paragraph (i) wherein said imprinted and written visible data carried by the flexible thin portion of the cheque and said stored encoded data stored in the storage chip each indicate a fixed value of the cheque, said fixed value corresponding to a pre-paid blocked amount credited to the cheque account.

4. The bank cheque system of claim 1, comprising cheques as defined in sub-paragraph (ii) wherein said cheque account is funded by transfer from said current account of an amount corresponding to an amount written on the cheque by the bearer, which amount is frozen in the cheque account after giving the instruction to transfer the amount to the cheque account, said credit account being funded through deposit or credit facilities.

5. The bank cheque system of claim 1, wherein the stored encoded data stored in the storage chip comprises a signature.

6. The bank cheque system of claim 1, wherein the storage chip associated therewith contains an image of at least one identification means.

7. The bank cheque system of claim 1, which further comprises a plurality of readers for reading the stored encoded data stored in the storage chip on the cheques, and a banking control system which includes servers at individual banks and a central banking control unit, the readers being installed with any parties that make transactions with and handle the cheques, including companies, merchants and hotels, and being connectable to the banking control system by a communications network.

8. The bank cheque system of claim 7, wherein said readers for reading the stored encoded data have the capability to read and display images stored in the storage chip.

9. The bank cheque system of claim 8, wherein the stored images in the storage chip are the signature of the cheques issuer expressed by a set of codes, letters and/or numbers; a stored image of the signature of the issuer of the cheque; a stored image of a thumb impression; or a personal photograph of the issuer of the cheque.

10. The bank cheque system of claim 8, wherein at least one of said readers is connected to a PC on which the stored images are displayed as a security check.

11. The bank cheque system of claim 9, wherein at least one of said readers is connected to a PC on which the stored images are displayed as a security check.

12. The bank cheque system of claim 7, wherein said readers are credit card readers, Point-of-Sale (POS) readers, a personal computer equipped with an external reader, or handheld readers, all comprising a keyboard through which particulars and information of a transaction can be entered.

13. The bank cheque system of claim 7, wherein the banking control system includes a Mid-Range Server.

14. The bank cheque system of claim 13, wherein the banking control system includes a Relational Database Management System (RDBMS) which contains particulars and information pertaining to the numbers of the cheques, together with truncations to be executed, bank codes and reader unit codes.

15. The bank cheque system of claim 14, comprising Communication Devices and peripherals through which connection is made between the aforementioned Mid Range Server and sub-servers, using various types of communications, including Dial-Up, Leased Line and ISDN.

16. The bank cheque system of claim 14 comprising FireWalls, for monitoring, controlling, and managing all communications with the Mid Range Server while eliminating unprompted and non-authorized entry.

17. The bank cheque system of claim 15 comprising FireWalls, for monitoring, controlling, and managing all communications with the Mid Range Server while eliminating unprompted and non-authorized entry.

18. The bank cheque system of claim 16 wherein the Mid-Range Server and FireWalls are installed within a Main Processing Center pertaining to an authority in charge for the new cheques for centralizing transactions of the bank cheque system and treating all transactions of the new cheques.

19. The bank cheque system of claim 15, wherein each sub-Server is a computer installed with each bank participating and subscribing in the service of the bank cheque system on which data and particulars pertaining to the subscribers are stored, together with the numbers of the encoded cheques issued by the bank, the same being connected with accounts of the clients.

20. The bank cheque system of claim 16, wherein each sub-Server is a computer installed with each bank participating and subscribing in the service of the bank cheque system on which data and particulars pertaining to the subscribers are stored, together with the numbers of the encoded cheques issued by the bank, the same being connected with accounts of the clients.

21. The bank cheque system of claim 17, wherein each sub-Server is a computer installed with each bank participating and subscribing in the service of the bank cheque system on which data and particulars pertaining to the subscribers are stored, together with the numbers of the encoded cheques issued by the bank, the same being connected with accounts of the clients.

22. The bank cheque system of claim 16, comprising a Sub Relational Database Management System (RDBMS) containing data and particulars confined to the clients of a particular bank only.

23. The bank cheque system of claim 17 comprising a Sub Relational Database Management System (RDBMS) containing data and particulars confined to the clients of a particular bank only.

24. The bank cheque system of claim 18 comprising a Sub Relational Database Management System (RDBMS) containing data and particulars confined to the clients of a particular bank only.

25. The bank cheque system of claim 19 comprising a Sub Relational Database Management System (RDBMS) containing data and particulars confined to the clients of a particular bank only.

26. The bank cheque system of claim 20 comprising a Sub Relational Database Management System (RDBMS) containing data and particulars confined to the clients of a particular bank only.

27. The bank cheque system of claim 21 comprising a Sub Relational Database Management System (RDBMS) containing data and particulars confined to the clients of a particular bank only.

28. The bank cheque system of claim 19, comprising sub-communication devices connectable between said sub-server and the reader devices.

29. The bank cheque system of claim 19, comprising sub-FireWalls for securing and monitoring entries to said sub-server.

30. The bank cheque system of claim 19, wherein each participating bank is equipped with a Sub-Server, a Sub Relational Database management System, sub-communication devices and sub-FireWalls.

31. The bank cheque system of claim 20, wherein each participating bank is equipped with a Sub-Server, a Sub Relational Database management System, sub-communication devices and sub-FireWalls.

32. The bank cheque system of claim 21, wherein each participating bank is equipped with a Sub-Server, a Sub Relational Database management System, sub-communication devices and sub-FireWalls.

33. The bank cheque system of claim 22, wherein each participating bank is equipped with a Sub-Server, a Sub Relational Database management System, sub-communication devices and sub-FireWalls.

34. The bank cheque system of claim 23, wherein each participating bank is equipped with a Sub-Server, a Sub Relational Database management System, sub-communication devices and sub-FireWalls.

35. The bank cheque system of claim 24, wherein each participating bank is equipped with a Sub-Server, a Sub Relational Database management System, sub-communication devices and sub-FireWalls.

36. A bank cheque having a front face carrying imprinted and written visible data, a rear face for endorsement, and a storage chip in which invisible data is encoded, the cheque comprising a flexible thin portion carrying the imprinted and written visible data and a thick portion wherein the storage chip is merged, the storage chip being merged in a surface of the thick portion of the cheque such that said surface of the thick portion extends from opposite sides of the storage chip whereby the storage chip is situated between different surface parts of the thick portion and occupies only a part of the surface area of the thick portion, the flexible thin portion of the cheque that carries visible data extending from the thick portion, the rear face of the flexible thin portion being left for endorsement, the stored encoded data stored in the storage chip in the thick portion being readable by means of a reader so its conformity with visible data carried by the flexible thin portion of the cheque can be verified to detect any unauthorized alterations to the cheque, the flexible thin portion of the cheque bearing an indication of an amount to be paid which is either a printed fixed amount, or a printed maximum amount associated with a writeable variable amount up to said maximum amount, or a writeable non-predefined variable amount, the stored encoded data stored in the storage chip including an identification of a cheque account containing blocked funds to cover the amount of the cheque, or permitting a verification that the blocked funds in the cheque account contain a sufficient blocked amount to cover the amount to be paid.

37. The bank cheque of claim 36, wherein said imprinted and written visible data carried by the flexible thin portion of the cheque and said stored encoded data stored in the storage chip each indicate a value of the cheque, said value being covered by a pre-paid amount credited to the cheque account.

38. The bank cheque of claim 36, wherein said imprinted and written visible data carried by the flexible thin portion of the cheque and said stored encoded data stored in the storage chip each indicate a fixed value of the cheque, said fixed value corresponding to a pre-paid blocked amount credited to the cheque account, said maximum amount corresponding to a pre-paid blocked amount which should not exceed the real amount of the cheque upon issue wherein the amount deposited shall be equal to the number of cheques issued multiplied by the maximum value of each cheque.

39. The bank cheque, of claim 36, made of plastic and distinguished by said thick portions on a short edge of the cheque wherein the storage chip is merged, the thick portion and its storage chip having dimensions and area adapted to the specifications for reading the stored data by suitable reader devices.

40. The bank cheque of claim 37, wherein said imprinted and written visible data carried by the flexible thin portion of the cheque and said stored encoded data stored on the storage chip each indicate a maximum value of the cheque.

41. The bank cheque of claim 40, in the form of a plastic cheque, distinguished by said thick portion on a short edge of the cheque wherein a storage chip is merged, said thick portion of the cheque and its storage chip having dimensions and area adapted to the specifications for reading the stored data by suitable reader devices.

42. The bank cheque of claim 37, wherein the cheque bears an entered non-predefined amount to be paid, said imprinted and written visible data carried by the flexible thin portion of the cheque and said stored encoded data stored on the storage chip each identifying a current account for funding the cheque whereby on passing or entering said thick portion of cheque through reader devices of the stored encoded data stored on the storage chip and entering the value of the cheque the amount will be transferred to the cheque account if the current account contains a sufficient blocked amount, and in case of there is no sufficient amount, the transaction will be refused.

43. The bank cheque of claim 42, in the form of a plastic cheque, distinguished by said thick portion portions on a short edge of the cheque wherein the storage chip is merged, the thick portion portion and its storage chip having dimensions and area adapted to the specifications for reading the stored data by suitable reader devices.

44. The bank cheque of claim 36, wherein the storage chip associated therewith contains an image of at least one identification means.

45. The bank cheque of claim 36, comprising a plastic sheet having a thick portion where a storage strip is merged, said plastic sheet being laminated on both sides with writing paper on which particulars of the cheque are printed.

46. The bank cheque of claim 44, further comprising a magnetized strip merged on the front or rear face of the cheque near to one of the sides.

47. The bank cheque of claim 45, wherein the thickness of the thick portion of the cheque corresponds to that required according to the specifications of standard reader devices for standard credit cards.

48. The bank cheque of claim 46, wherein the thickness of the thick portion of the cheque corresponds to that required according to the specifications of standard reader devices for standard credit cards.

49. The bank cheque of claim 36, wherein the flexible thin portion of the cheque comprises a sheet of paper between two plys of transparent plastic leaving spaces without covering to add the required particulars and data on it and/or for endorsement.

50. The bank cheque of claim 36, wherein the storage chip is located on a thick portion of the cheque devoid of said imprinted and written visible data carried by the cheque.

51. The bank cheque of claim 50, wherein the storage chip is located on a thick portion of the cheque protruding from a short edge of the flexible thin portion of the cheque that carries imprinted and written visible data.

52. A method of controlling the authenticity and guaranteeing the funding of a bank cheque having a front face carrying imprinted and written visible data, a rear face for endorsement, and a storage chip in which invisible data is encoded, the cheque comprising a flexible thin portion carrying the imprinted and written visible data and a thick portion wherein the storage chip is merged, the storage chip being merged in a surface of the thick portion of the cheque such that said surface of the thick portion extends from opposite sides of the storage chip whereby the storage chip is situated between different surface parts of the thick portion and occupies only a part of the surface area of the thick portion, the flexible thin portion of the cheque that carries visible data extending from the thick portion, the rear face of the flexible thin portion being left for endorsement, the stored encoded data stored in the storage chip in the thick portion being readable by means of a reader so its conformity with visible data carried by the flexible thin portion of the cheque can be verified to detect any unauthorized alterations to the cheque, the flexible thin portion of the cheque bearing an indication of an amount to be paid which is either a printed fixed amount, or a printed maximum amount associated with a writeable variable amount up to said maximum amount, or a writeable non-predefined variable amount, the stored encoded data stored in the storage chip including an identification of a cheque account containing blocked funds to cover the amount of the cheque, or permitting a verification that the blocked funds in the cheque account contain a sufficient blocked amount to cover the amount to be paid, which method comprises:

passing or entering the cheque through a reader connected to a banking control system wherein the thick portion of the cheque containing the storage chip is passed through or entered in the reader, the storage chip being merged in a surface of the thick portion of the cheque such that said surface of the thick portion extends from opposite sides of the storage chip whereby the storage chip is situated between different surface parts of the thick portion and occupies only a part of the surface area of the thick portion, the flexible thin portion of the cheque that carries visible data extending from the thick portion, and the rear face of the flexible thin portion being left for endorsement, comparing the imprinted visible and written data on the flexible thin portion of the cheque with the read stored encoded data stored on the storage chip, ascertaining whether or not the cheque account contains a sufficient blocked amount to cover the amount of the cheque, and providing verification if the cheque account does contain a sufficient blocked amount whereby the cheque can be paid or endorsed as a cash instrument.

53. The method of claim 52, comprising issuing cheques wherein said imprinted and written visible data carried by the flexible thin portion of the cheque and stored encoded data stored in the storage chip each indicate a value of the cheque, said value being covered by a prepaid amount credited to a cheque account.

54. The method of claim 53, comprising issuing cheques wherein said imprinted and written visible data carried by the flexible thin portion of the cheque and said stored encoded data stored in the storage chip each indicate a maximum value of the cheque, said maximum amount corresponding to a pre-paid blocked amount credited to a cheque account which must not exceed the real value of the cheque upon issue, wherein the amount deposited is equal to the number of cheques issued multiplied by the maximum value of each cheque.

55. The method of claim 52, comprising issuing cheques wherein said imprinted and written visible data carried by the flexible thin portion of the cheque and said stored encoded data stored in the storage chip each indicate a fixed value of the cheque, said fixed value corresponding to a pre-paid blocked amount credited to a cheque account.

56. The method of claim 52, comprising issuing cheques whose flexible thin portions have a space for entry of a non-predefined amount to be paid, and whereon said imprinted and written visible data carried by the flexible thin portion of the cheque and stored encoded data stored on the storage chip in the thick portion of the cheque each identify a current account from which the cheque account can be funded, the method further comprising passing the thick portion of the cheque though a reader connected to a banking control system, entering into the reader an amount to be paid entered on the cheque, ascertaining whether or not the current account has a sufficient credit to cover said amount, and transferring funds to said cheque account to provide a sufficient blocked amount corresponding to the amount entered on the cheque.

57. The method of claim 56, wherein said verification that the cheque account contains a sufficient blocked amount is readable by passing or entering the thick portion of the cheque through a reader connected to the banking control system.

58. The bank cheque system of claim 1, wherein the thick portion of the cheque in which the storage chip is merged is made of plastic.

59. The bank cheque of claim 36, wherein the thick portion of the cheque in which the storage chip is merged is made of plastic.

* * * * *